US008200301B2

(12) United States Patent
Yamamoto et al.

(10) Patent No.: US 8,200,301 B2
(45) Date of Patent: Jun. 12, 2012

(54) MOBILE WIRELESS COMMUNICATION APPARATUS HAVING A PLURALITY OF ANTENNA ELEMENTS

(75) Inventors: Atsushi Yamamoto, Kyoto (JP); Hiroshi Iwai, Osaka (JP); Tsutomu Sakata, Osaka (JP); Yoshio Koyanagi, Ishikawa (JP); Toshiteru Hayashi, Kanagawa (JP)

(73) Assignee: Panasonic Corporation, Osaka (JP)

( * ) Notice: Subject to any disclaimer, the term of this patent is extended or adjusted under 35 U.S.C. 154(b) by 450 days.

(21) Appl. No.: 12/516,611

(22) PCT Filed: Sep. 30, 2008

(86) PCT No.: PCT/JP2008/002753
§ 371 (c)(1),
(2), (4) Date: Jul. 14, 2009

(87) PCT Pub. No.: WO2009/044541
PCT Pub. Date: Apr. 9, 2009

(65) Prior Publication Data

US 2010/0056234 A1 Mar. 4, 2010

(30) Foreign Application Priority Data

Oct. 2, 2007 (JP) ................................ 2007-258655

(51) Int. Cl.
*H04M 1/00* (2006.01)

(52) U.S. Cl. ................... 455/575.7; 455/575.5; 370/339

(58) Field of Classification Search ..... 455/575.1–575.8
See application file for complete search history.

(56) References Cited

U.S. PATENT DOCUMENTS

| | | | | |
|---|---|---|---|---|
| 6,999,793 | B2 * | 2/2006 | Jinushi | 455/558 |
| 2004/0106428 | A1 * | 6/2004 | Shoji | 455/550.1 |
| 2005/0181847 | A1 * | 8/2005 | Boyle | 455/575.7 |

FOREIGN PATENT DOCUMENTS

| | | |
|---|---|---|
| EP | 1 763 145 | 3/2007 |
| JP | 57-103406 | 6/1982 |
| JP | 62-154902 | 7/1987 |
| JP | 2004-129234 | 4/2004 |
| JP | 2004-274730 | 9/2004 |
| JP | 2004-312381 | 11/2004 |
| JP | 2005-354322 | 12/2005 |
| JP | 3830773 | 7/2006 |
| JP | 2006-319864 | 11/2006 |
| WO | 2007/004499 | 1/2007 |

OTHER PUBLICATIONS

International Search Report mailed Jan. 20, 2009 for International Application No. PCT/JP2008/002753.

* cited by examiner

*Primary Examiner* — Rafael Pérez-Gutiérrez
*Assistant Examiner* — Keith Fang
(74) *Attorney, Agent, or Firm* — Wenderoth, Lind & Ponack, L.L.P.

(57) ABSTRACT

A housing antenna is small enough in size so as to be accommodated in a mobile device. The antenna has a number of feeding points that allow the antenna to operate as a number of antennal elements. The antenna is capable of realizing high-speed communication by increasing communication capacity.

24 Claims, 20 Drawing Sheets

Elevation Pattern Gain Display
(dBi)

Elevation Pattern Gain Display
(dBi)

Elevation Pattern Gain Display
(dBi)

MOBILE WIRELESS COMMUNICATION APPARATUS HAVING A PLURALITY OF ANTENNA ELEMENTS

TECHNICAL FIELD

The present invention relates to an antenna unit for a wireless communication apparatus, the antenna unit being controlled so as to realize high speed communication by increasing channel capacity while maintaining high communication quality in mobile communication using a mobile telephone or the like, and more particularly to a wireless communication apparatus equipped with a MIMO antenna and/or an adaptive array antenna.

BACKGROUND ART

As an antenna device employing MIMO (Multi-Input Multi-Output) technique for transmitting and receiving wireless signals of a plurality of channels simultaneously by using a plurality of antennas, a MIMO antenna device is disclosed in Patent Document 1, for example.

The conventional MIMO antenna device disclosed in Patent Document 1 includes four groups of antenna elements, the respective groups being arranged at even intervals, and a main body. Each group of antenna elements includes four antenna elements having polarization directions different from each other. Meanwhile, the main body includes a switch section connected to the antenna elements, a signal reception section receiving a reception signal via the switch section, an antenna control section generating a control signal for the switch section, an antenna selection section generating a combination of the antenna elements to inform the antenna control section of information of the selected elements, and an antenna determination section determining, based on the reception signal received by the antenna elements generated by the antenna selection section, a specific combination of the antenna elements to inform the antenna control section of information of the determined elements.

The conventional MIMO antenna device with the above-described configuration is intended to reduce correlation between antenna elements and ensure sufficient transmission capacity by determining a combination of the antenna elements in a manner that one antenna element is selected from each group of antenna elements.

That is, in the conventional MIMO antenna device, a plurality of antenna elements operate simultaneously and then each of the antenna elements obtains largest possible received power, thereby increasing total transmission rate of a plurality of signal sequences after MIMO demodulation. The MIMO antenna device described in Patent Document 1 achieves this by including more antenna elements in number than channels for concurrent communication and by selecting the antenna elements, each having larger received signal strength therefrom.

Such selection of the antenna elements is especially effective in mobile communication in the case where signal intensities of main polarization and cross polarization temporally vary or an arriving angle thereof varies, in accordance with a movement of a mobile station (user) and/or time-dependent change of an ambient environment. Further, a change in the polarization direction can be dealt with by using the antenna elements having different polarization characteristics from each other, and the time-dependent change can be overcome by controlling the antenna elements to be switched.

As described above, the MIMO antenna device described in Patent Document 1 including the plurality of groups of antenna elements, each group having the plurality of antenna elements, and can reduce correlation between the antenna elements or increase transmission capacity by causing the switch section to select a combination of the antenna elements having the weakest correlation therebetween or a combination of the antenna elements having the largest transmission capacity.

Further, with reference to Patent Documents 2 and 3, an example of a mobile wireless communication apparatus utilizing a portion thereof as an antenna will be described.

In a mobile wireless communication apparatus described in Patent Document 2, a part of a conductive housing of the mobile communication apparatus operates as a part of an antenna so as to aim at reduction of production costs, thinning and downsizing by reduction of the number of parts without employing dedicated parts for an antenna. Further, it is possible to configure a larger antenna by causing the housing itself to operate as the antenna, whereby higher sensitivity of the antenna can be expected. According to the mobile wireless communication apparatus described in Patent Document 2, high quality wireless communication can be expected, as to the portable telephone desired to be downsized, by causing the conductive housing to operate as a part of the antenna.

A mobile telephone described in Patent Document 3 is aimed at reduction of gain variation depending on a condition of a user's hand, and configuration of a lip-type mobile telephone 1 is disclosed, where a shield box 14 in the upper housing 3 and an output terminal of a transmission circuit 15 within the lower housing 4 are connected by a flexible cable 9, and the shield box 14 is used as an antenna (FIG. 3 of Patent Document 3). With such configuration where the shield box 14 is used as the antenna, the gain variation depending on the condition of the user's hand can be diminished.

[Patent Document 1] Japanese Laid-Open Patent Publication No. 2004-312381

[Patent Document 2] Japanese Laid-Open Patent Publication No. 2004-274730

[Patent Document 3] Japanese Examined Patent Publication No. 3830773

SUMMARY OF THE INVENTION

Problems to be Solved by the Invention

However, the conventional MIMO antenna device described in Patent Document 1 has the following problems.

The conventional MIMO antenna device includes, as described above, more antenna elements in number than the channels for the MIMO concurrent communication in order to obtain the largest possible received power, and performs MIMO demodulation by selecting antenna elements having stronger received signal strength from among the included antenna elements. However, a small device such as a mobile telephone in a one-wavelength size or less has a problem. That is, in the case where a plurality of antennas are mounted, a distance between adjacent antennas becomes small, so that radiation efficiency is decreased owing to mutual coupling between antenna elements and to the MIMO communication performed with an antenna array composed of antennas having the same polarization.

On the other hand, a conventional mobile wireless communication apparatus as described in Patent Document 2 has the following problems.

According to the conventional mobile wireless communication apparatus proposes a construction downsized by using a part of the conductive housing as an antenna, and a construction suitable for a single antenna or switching diversity with a slot antenna. However, the mutual coupling between antenna elements is not a problem since a single antenna operates even in the case of the switching diversity, and thus configuration of an antenna to reduce the mutual coupling is not taken into consideration. That is, the mobile wireless communication apparatus disclosed in Patent Document 2 cannot be used as a MIMO antenna in a MIMO antenna or an adaptive array antenna where a plurality of antennas operate concurrently.

Further, according to the conventional antenna included in a mobile telephone disclosed in Patent Document 3, only an operation of a single antenna is considered, and configuration of a MIMO antenna or an adaptive array antenna where a plurality of antennas concurrently operate is not considered.

Accordingly, an object of the present invention is to provide a wireless communication apparatus for a mobile object, the apparatus having lower mutual coupling between antennas in order to allow a plurality of feed antenna elements to concurrently maintain good reception conditions even if the apparatus is small-sized.

Solution to the Problems

The present invention is directed to a mobile wireless communication apparatus including a plurality of antenna elements. In order to achieve the above-described object, one embodiment of the present invention includes a rectangular-shaped first conductor section; a second conductor section having the same shape as the first conductor section, arranged in parallel with and spaced from the first conductor section so as to have a predetermined distance therebetween; three short-circuit conductor sections electrically connecting any three edges of the first conductor section with face-to-face three edges of the second conductor section; a ground conductor section spaced by a predetermined distance from the first conductor section; and a wireless communication circuit, wherein a first feeding point on the first conductor section is connected to the wireless communication circuit via a first power supply section arranged between the first conductor section and the ground conductor section, so that the first conductor section and the ground conductor section are allowed to operate as a first antenna element; and a second feeding point on the second conductor section is connected to the wireless communication circuit via a second power supply section arranged between the first conductor section and the second conductor section, so that the first conductor section, the second conductor section and the short-circuit conductor sections are allowed to operate as a second antenna element.

When the length of one edge, to which the three short-circuit conductor sections are not connected, is set at a half wavelength of a communication signal, the second antenna element can operate as a half-wavelength slot antenna. Only adjacent two short-circuit conductor sections may be connected to the first and the second conductor sections, and the total length of the adjacent two short-circuit conductor sections may be set at one-half of the communication signal wavelength. Further, a part of a housing of the mobile wireless communication apparatus, the housing being formed of a conductive material, may be used as the first conductor section. Still further, the wireless communication circuit may be mounted on the first conductor section.

When one second antenna element is caused to operate at a different frequency, either one of the short-circuit conductor sections may be controlled to be switched in accordance with the frequency. In this case, as the one of the short-circuit conductor sections, a parallel resonant circuit including an inductor and capacitor, a switch circuit controlled by the control section and the like can be employed.

Here, the mobile wireless communication apparatus of the present invention can be caused to operate as an adaptive antenna when the mobile wireless communication apparatus further includes an adaptive control circuit executing adaptive control processing on a wireless signal received by each of the First and the second antenna elements to synthesize the adaptively controlled wireless signals; a demodulation circuit demodulating the synthesized wireless signal as well as a wireless signal individually received by each of the first antenna element and the second antenna element; and an apparatus control circuit controlling the adaptive control circuit so as to compare signal integrity obtained from demodulation of the synthesized wireless signal, and signal integrity obtained from demodulation of the wireless signals received by the First and the second antenna elements with each other, and causing the adaptive control circuit to receive a wireless signal having optimum signal integrity determined by the comparison.

Further, the mobile wireless communication apparatus of the present invention can be caused to operate as a selection diversity antenna when a mobile wireless communication apparatus further includes a first processing circuit executing adaptive control processing on the wireless signals received by the first and the second antenna elements; a second processing circuit executing selection diversity processing on the wireless signals received by the First and the second antenna elements; and a selection circuit comparing signal integrity of a wireless signal outputted from the first processing circuit, with signal integrity of a wireless signal outputted from the second processing circuit, and selectively outputting a signal having desirable signal integrity.

Furthermore, the mobile wireless communication apparatus of the present invention can be caused to operate as a combined diversity antenna when a mobile wireless communication apparatus further includes an adaptive control circuit executing adaptive control processing on a wireless signal received by each of the first and the second antenna elements, and synthesizing the adaptively controlled wireless signals; and an apparatus control circuit detecting phase and amplitude of a wireless signal received by each of the first and the second antenna elements, and controlling the adaptive control circuit so as to perform maximum ratio combining on the wireless signals.

Still further, when a mobile wireless communication apparatus further includes a MIMO demodulation circuit executing a MIMO demodulation processing on a wireless signal received by each of the first and the second antenna elements to output one demodulated signal, the mobile wireless communication apparatus of the present invention can be caused to operate as a MIMO antenna.

Effect of the Invention

According to the above-described present invention, an array antenna can be realized in a small terminal without significantly increasing the number of parts of the antenna. Additionally, the antenna can be enlarged to a large extent by using the housing itself as an antenna. Further, mutual coupling between antennas can be reduced by arranging the short-cut side of the slot antenna so as to face the power supply section for the housing antenna. Still further, a correlation coefficient between antennas can be lowered by arranging antennas so as to have different radiation directivity from each other. Therefore, increase in performance as an array antenna can be expected, and an improved operation of a MIMO antenna and/or an adaptive array antenna can be provided.

DESCRIPTION OF THE REFERENCE CHARACTERS

Figure 1:
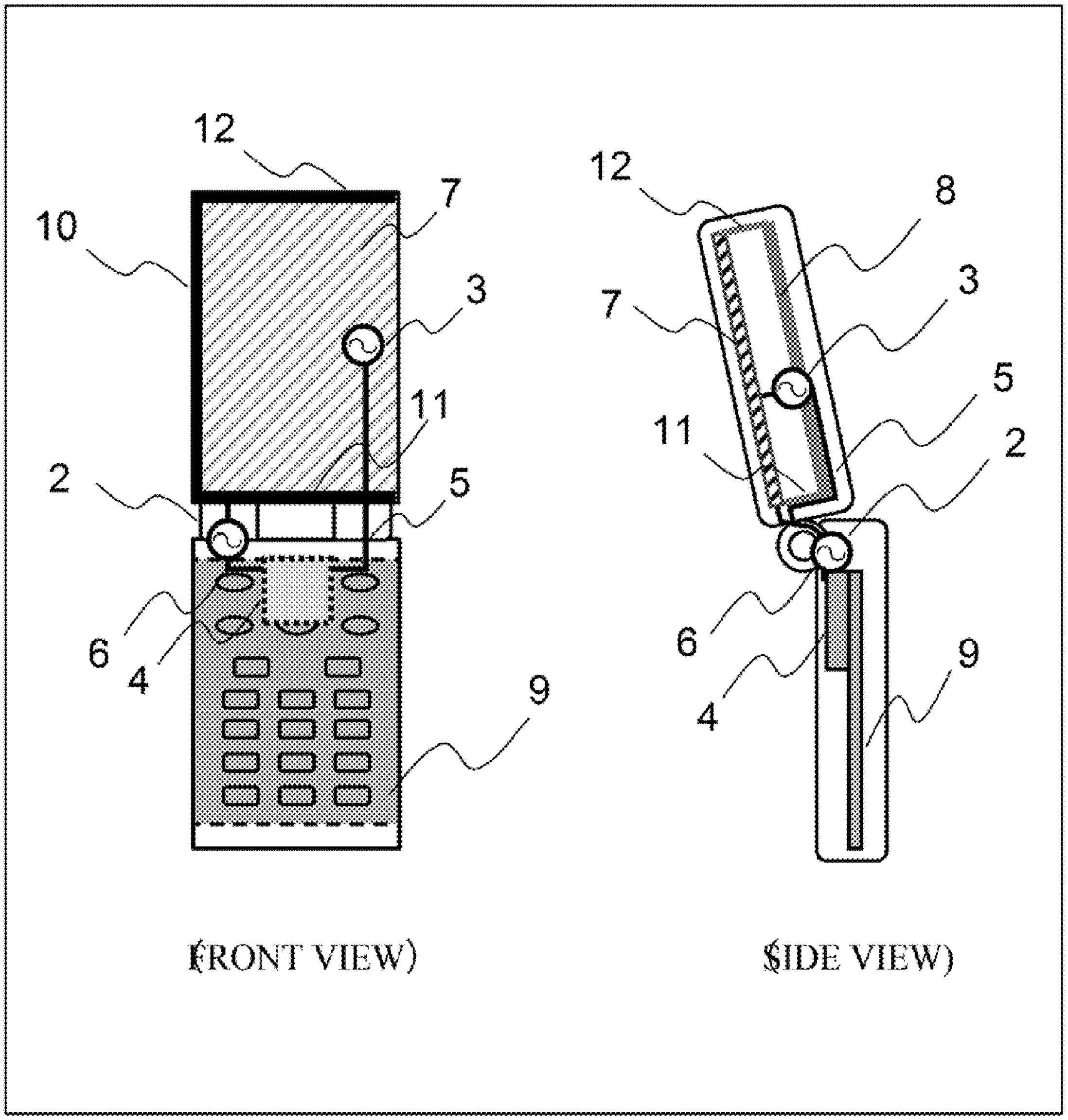
FIG. 1 shows diagrams each illustrating an inner structure of a mobile wireless communication apparatus according to a first embodiment of the present invention.

2, 3 power supply section
4 wireless communication circuit
5, 6 feedline
7, 8 conductor section
9 ground conductor section
10-12 short-circuit conductor section
20 housing antenna
30 slot antenna
41 inductor
42 capacitor
43 switch
100*a-d*, 201, 202, 40*a-c*, 501*a-c*, 507 antenna element
101, 502 A/D converter circuit
102 adaptive control circuit
103, 405, 505 controller
104*a-d*, 402*a-c* variable amplifier
105*a-d*, 403*a-c* variable phase-shifter
106, 406 signal synthesizer
107 demodulator
109 determinator
203, 204 processing circuit
205, 206 wave detector
207 signal integrity monitoring circuit
208 selection circuit
404*a-c* received signal wave detector
503 MIMO demodulation circuit
504 signal level comparison circuit
506 wireless transmission circuit

DETAILED DESCRIPTION OF THE INVENTION

Embodiments of the present invention will be described in detail with reference to the drawings. Note that with respect to figures for describing the embodiments of the present invention, components having similar functions are denoted by the same reference numerals and repeated description thereof will be omitted.

(First Embodiment)

FIG. 1 is a front view and a side view each showing an inner structure of a mobile wireless communication apparatus according to a first embodiment of the present invention. In FIG. 1, the mobile wireless communication apparatus according to the first embodiment of the present invention includes a first and a second power supply sections 2 and 3, a wireless communication circuit 4, a first and a second feedlines 6 and 5, a first and a second conductor sections 7 and 8, a ground conductor section 9, and three short-circuit conductor sections 10 to 12. The first conductor section 7 and the second conductor section 8 have the same rectangular configuration.

The mobile wireless communication apparatus according to the first embodiment includes, as an antenna array, a housing antenna which is obtained by using a part or a conductive housing as an antenna, and a half-wavelength slot antenna which is obtained by using a part of the conductive housing as a ground plane. The first power supply section 2 is a power supply section for supplying power to the housing antenna via the first feedline 6. The second power supply section 3 is a power supply section for supplying power to the half-wavelength slot antenna via the second feedline 5. The first and second power supply sections 2 and 3 are connected to the wireless communication circuit 4 and allow wireless communication. The wireless communication circuit 4 includes high-frequency circuits such as a filter, an amplifier and a frequency conversion mixer, and a baseband circuit such as a modulator and a demodulator.

First, an operation of a housing antenna 20 will be described with reference to FIG. 2 and FIG. 3, and an operation of a half-wavelength slot antenna 30 will be described with reference to FIG. 4 and FIG. 5, respectively.

Figure 2:
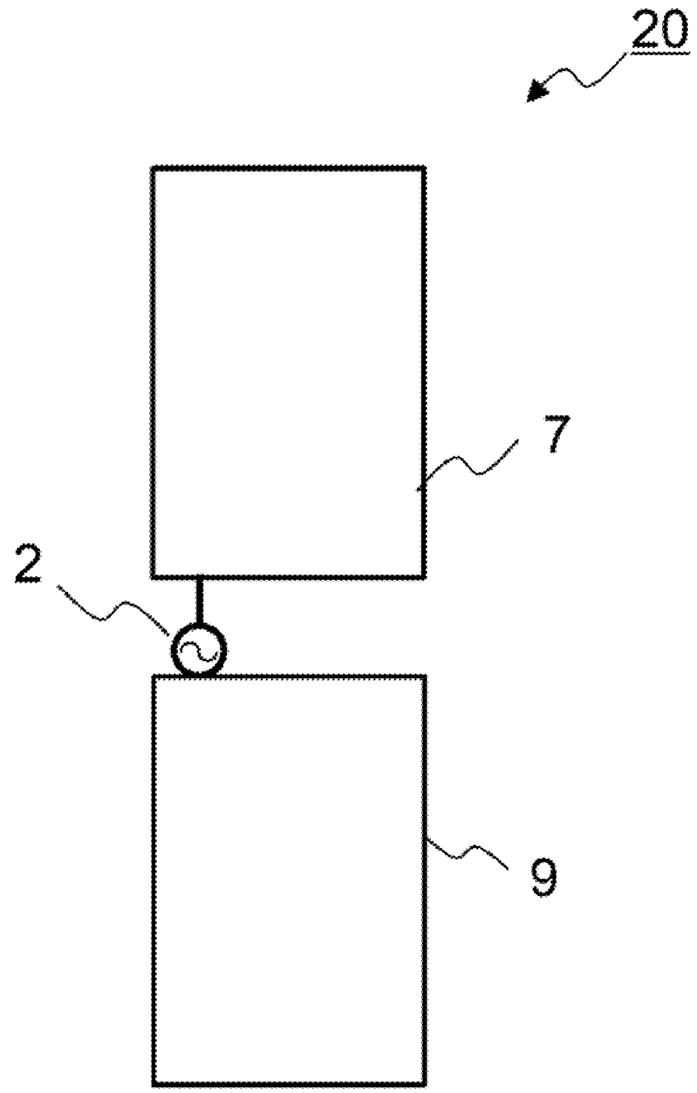
FIG. 2 shows a diagram illustrating a structure of a housing antenna 20.

FIG. 2 shows a schematic structure of the housing antenna 20. The housing antenna 20 includes a first conductor section 7, a ground conductor section 9 and a first power supply section 2. The first conductor section 7 is a ground plane of the upper housing of a flip-type telephone. The ground conductor section 9 is a ground plane of the lower housing of the flip-type telephone. The first power supply section 2 is disposed at a hinge portion connecting the first conductor section 7 and the ground conductor section 9.

Figure 3:
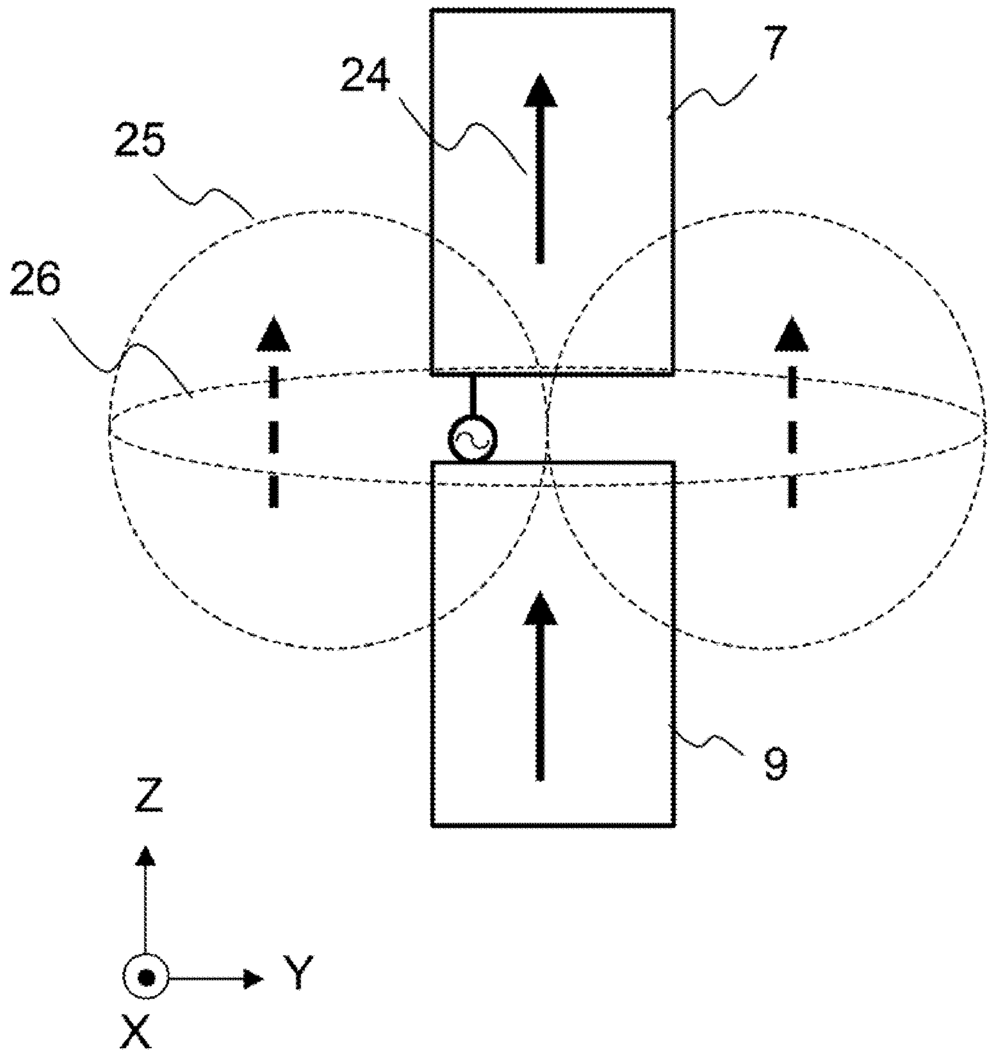
FIG. 3 shows a schematic diagram illustrating directions of currents, a direction of an electric field and a radiation pattern of the housing antenna 20.

FIG. 3 is a schematic diagram showing a direction of a current, a direction of an electric field and a radiation pattern, in the housing antenna 20. As shown in FIG. 3, in the housing antenna 20, a high-frequency current 24 flows to the first conductor section 7 and to the ground conductor section 9, whereby radio waves are emitted. The current flows in a similar manner to that of a dipole antenna, and thus, has radiation directivity such as a figure-eight directional sensitivity 25 on a plane (ZY plane) of the sheet of the drawings and non-directional sensitivity on a plane (XY plane) perpendicular to the plane of the sheet. Note that the direction 26 of the electric field of the emitted radio waves is parallel to that of the high-frequency current 24.

Figure 4:
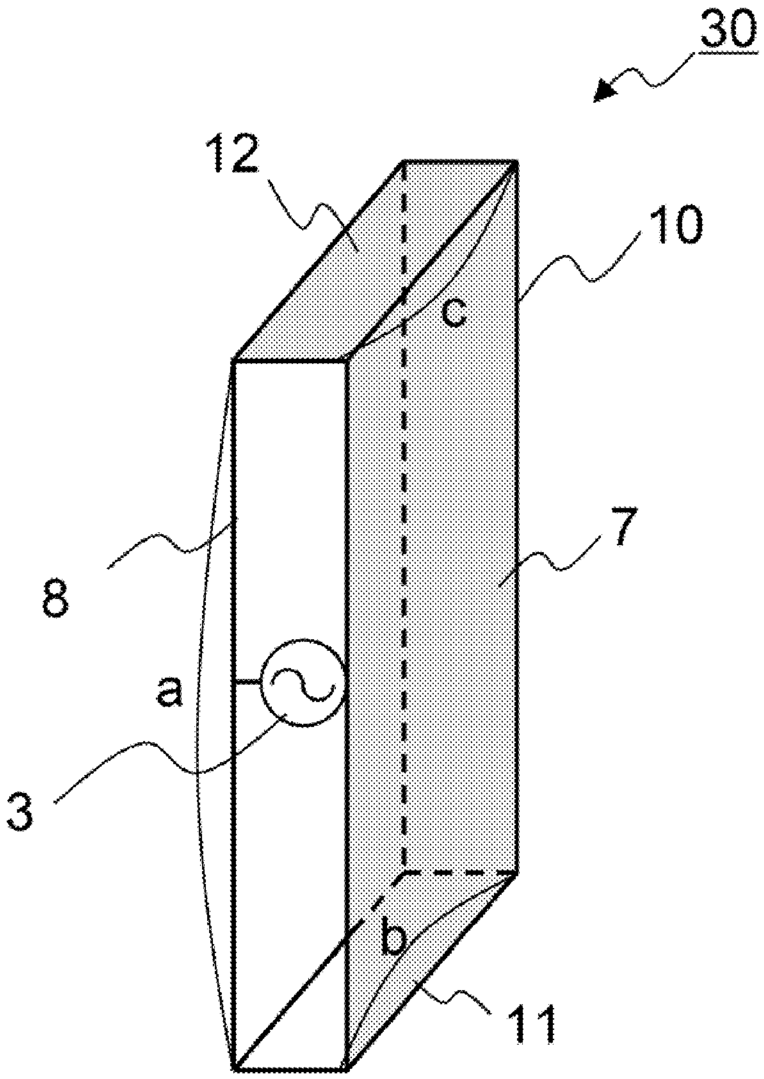
FIG. 4 shows a diagram illustrating a structure of a half-wavelength slot antenna 30.

FIG. 4 shows a structure of the half-wavelength slot antenna 30. The half-wavelength slot antenna 30 includes a first conductor section 7, a second conductor section (top face conductor section) 8, three short-circuit conductor sections 10 to 12, and a second power supply section 3. The first conductor section 7 is arranged parallel to and apart from the second conductor section 8 having a predetermined distance therebetween, and three edges thereof are electrically connected via the three short-circuit conductor sections 10 to 12, respectively, each conductor section having a width equal to the predetermined distance. That is, the half-wavelength slot antenna 30 is open top box shaped, the short-circuit conductor section 10 forming the bottom face, and the short-circuit conductor section 11, the short-circuit conductor section 12, the first conductor section 7 and the second conductor section 8 forming side faces. The second power supply section 3 supplies power between the first conductor section 7 and the second conductor section 8. The half-wavelength slot antenna 30 is designed such that a length of one edge (line a), to which the short-circuit conductor sections 10 to 12 are not connected, of the first conductor section 7 (or the second conductor section 8) is a half of the wavelength of a communication signal.

Note that, although the open top box shaped half-wavelength slot antenna 30 is described in the first embodiment, the short-circuit conductor section 11 or the short-circuit conductor section 12 can be omitted. That is, when the total length of two edges (line a and line b), to which the short-circuit conductor sections 10 and 12 are not connected, of the first conductor section 7 is a half of the wavelength of the communication signal, the short-circuit conductor section 11 is unnecessary. Further, when the total length of two edges (line a and line c), to which the short-circuit conductor sections 10 and 11 are not connected, of the conductor section 7 is a half of the wavelength of the communication signal, the short-circuit conductor section 12 is unnecessary.

Figure 5:
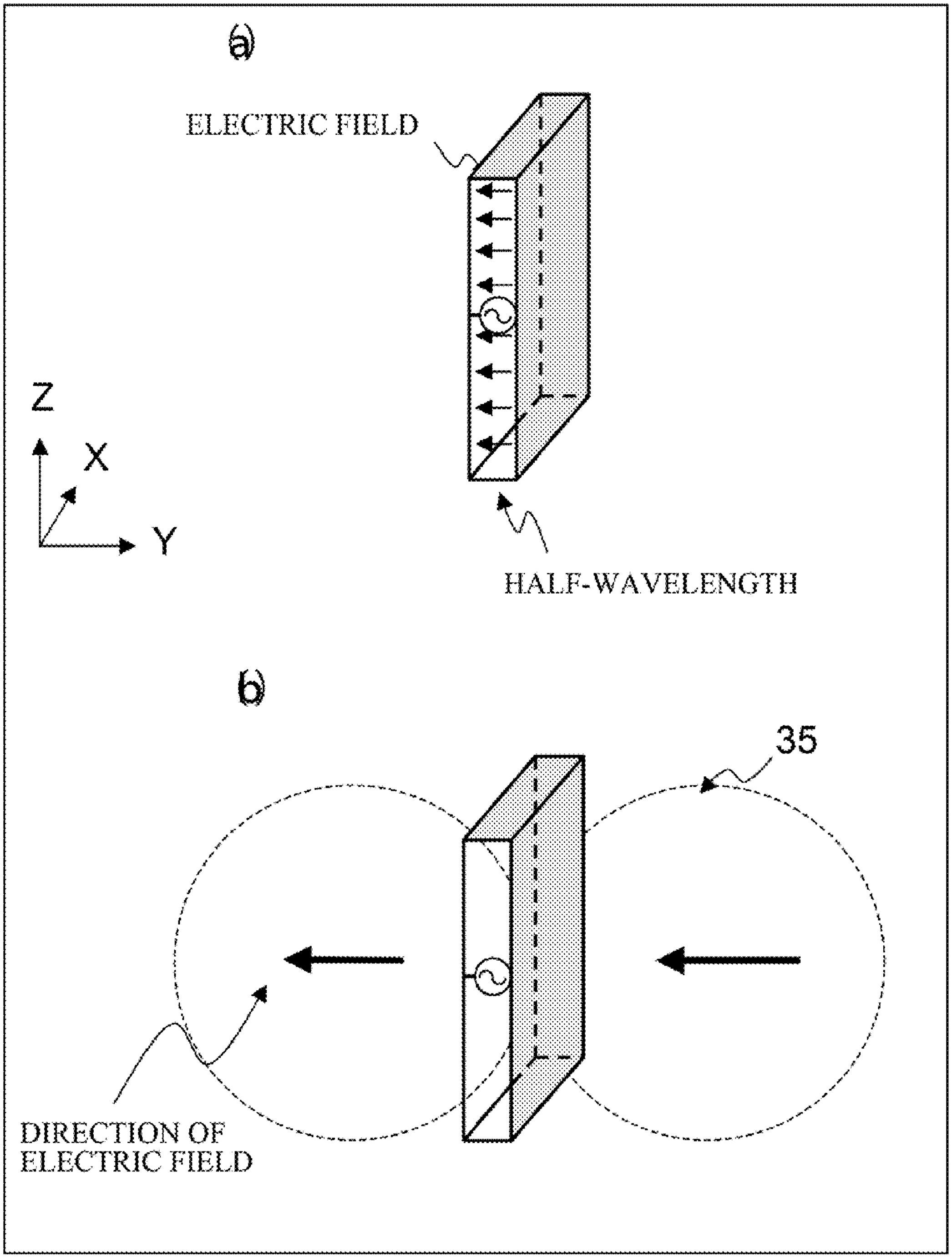
FIG. 5 shows schematic diagrams illustrating a direction and a radiation pattern of an electric field excited at the half-wavelength slot antenna 30.

FIG. 5 shows schematic diagrams illustrating a direction and a radiation pattern of an electric field that is excited in the half-wavelength slot antenna 30. As shown in FIG. 5, in the half-wavelength slot antenna 30, power supply from the second power supply section 3 generates an electric field 35 between the first conductor section 7 and the second conductor section 8, and the short-circuit conductor section 10 functions as a reflection plate, whereby a high radiation directivity 36 in a Z-direction can be obtained.

Next, examples of prototypes of the housing antenna 20 and the half-wavelength slot antenna 30 will be described with reference to FIG. 6 through FIG. 11.

Figure 6:
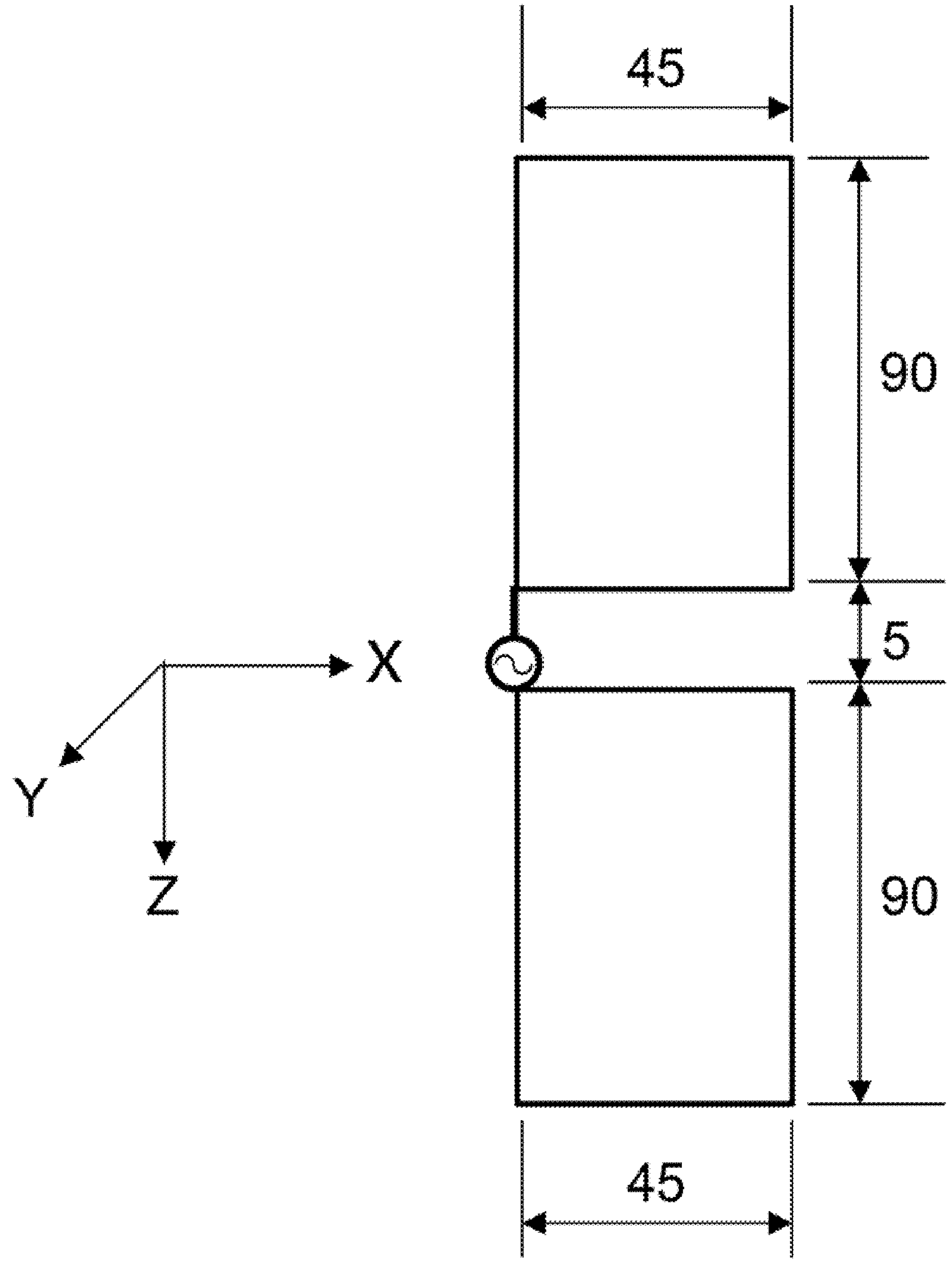
FIG. 6 shows a diagram illustrating an exemplary prototype of the housing antenna 20.
Figure 7:
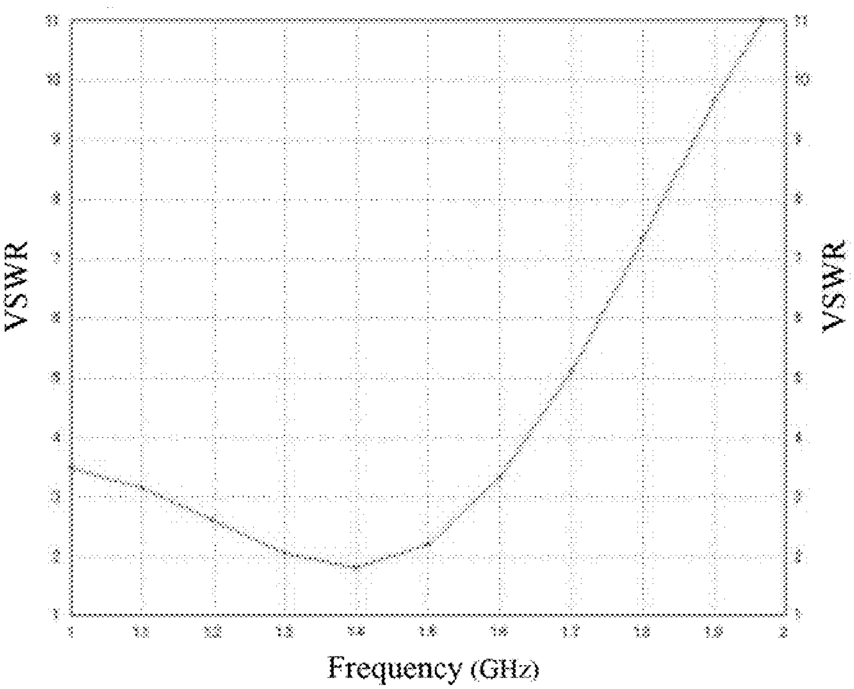
FIG. 7 shows a diagram illustrating impedance characteristics of the housing antenna 20 shown in FIG. 6.
Figure 8:
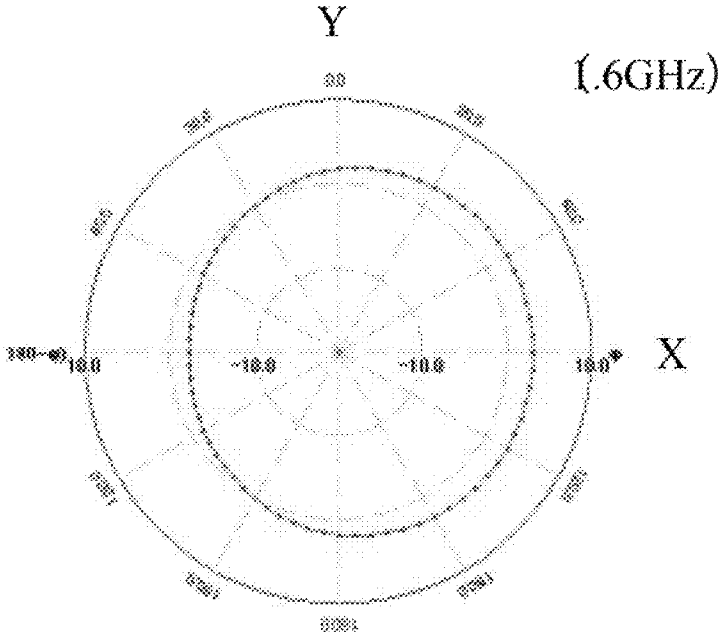
FIG. 8 shows a diagram illustrating a radiation pattern of the housing antenna 20 shown in FIG. 6.

FIG. 6 is an exemplary prototype of the housing antenna 20. In the prototype, a first conductor section 7 and a ground conductor section 9 are rectangular measuring 45 mm×90 mm, and have a distance of 5 mm therebetween. Further, FIG. 7 and FIG. 8 show impedance characteristics (input VSWR) and a radiation pattern (XY plane), respectively. From FIG. 7, it can be seen that the housing antenna 20 resonates at 1.4 GHz. Note that FIG. 8 shows a radiation pattern of a frequency of 1.6 GHz. According to FIG. 8, slightly higher directivity in an X-direction can be seen. This is because the power supply section is not symmetrical with respect to the antenna. However, it is apparent that non-directional can be substantially obtained.

Figure 9:
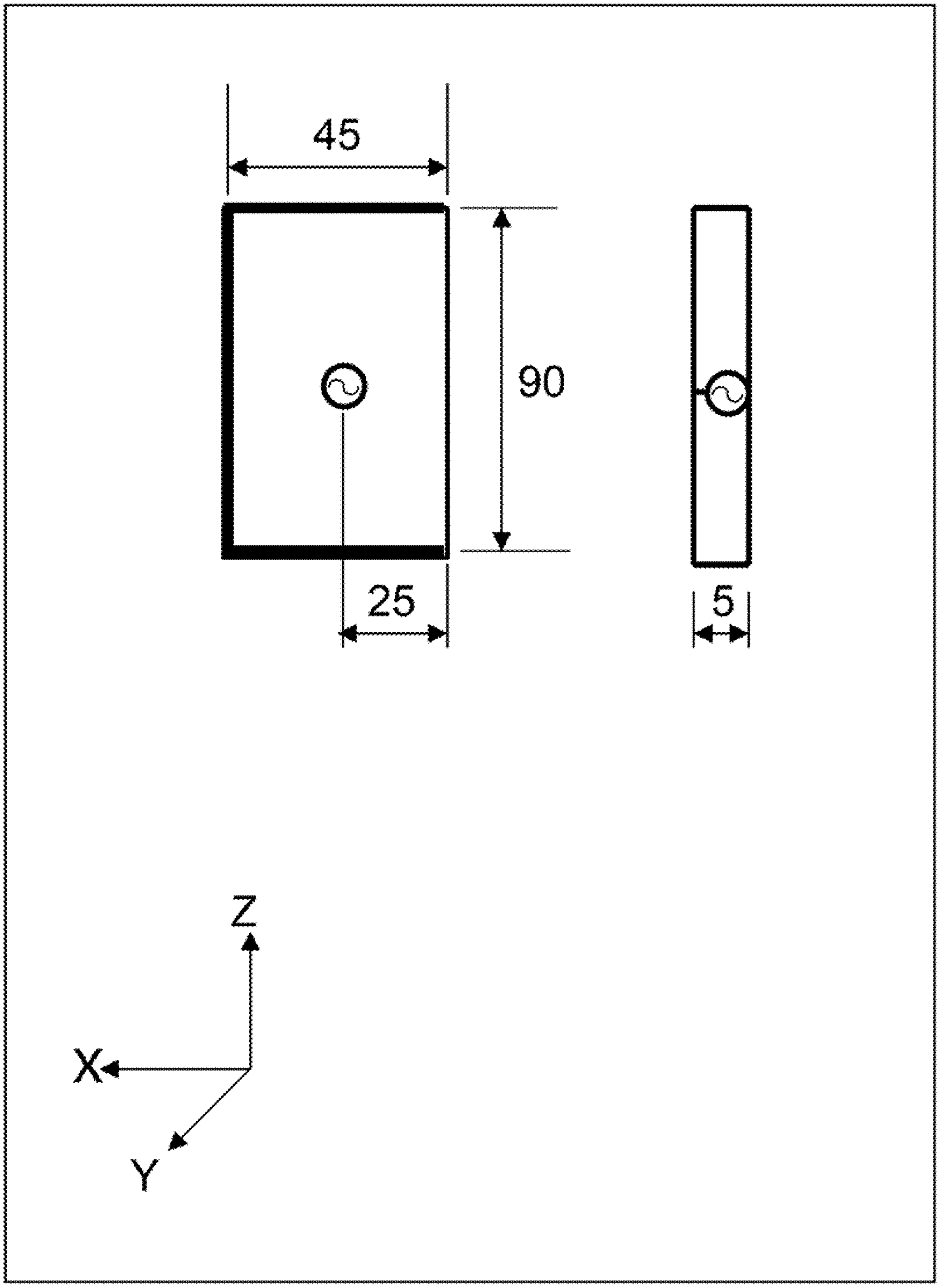
FIG. 9 shows a diagram illustrating an exemplary prototype of the half-wavelength slot antenna 30.
Figure 10:
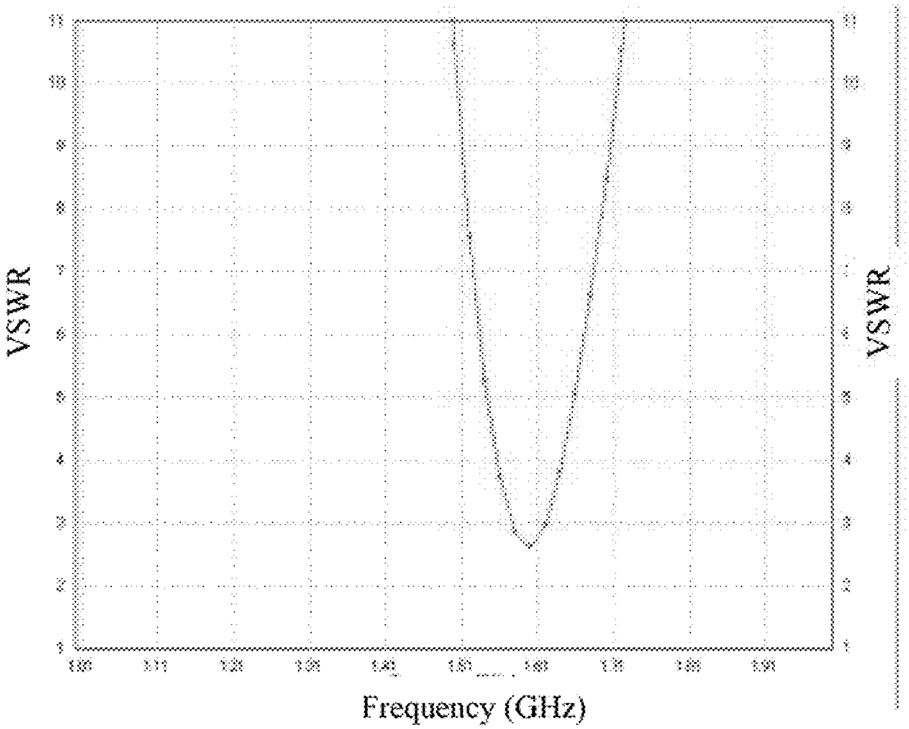
FIG. 10 shows a diagram illustrating impedance characteristics of the half-wavelength antenna 30 shown in FIG. 9.
Figure 11:
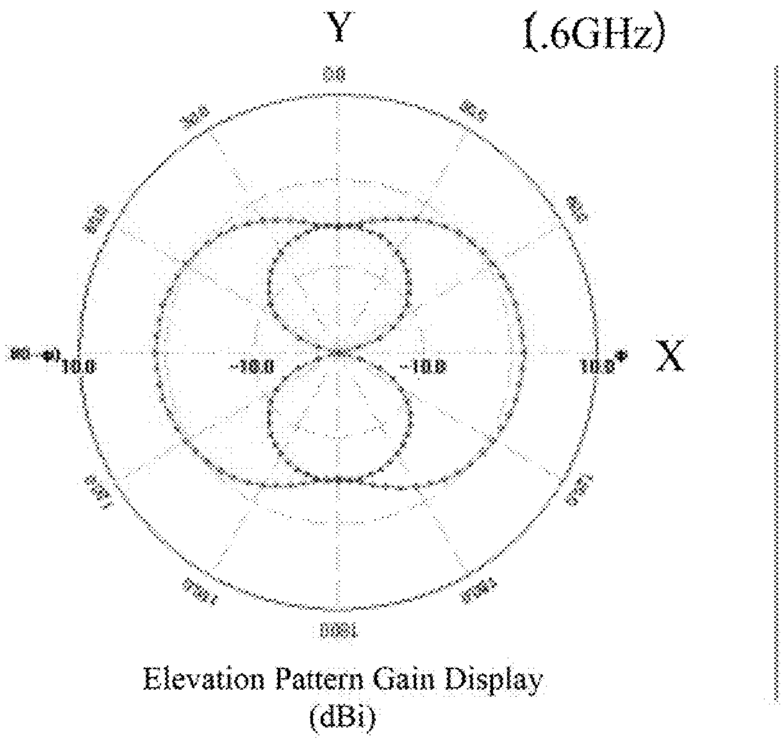
FIG. 11 shows a diagram illustrating a radiation pattern of the half-wavelength antenna 30 shown in FIG. 9.

FIG. 9 is an exemplary prototype of a half-wavelength slot antenna 30. In the exemplary prototype, a first conductor section 7 and a second conductor section 8 are rectangular measuring 45 mm×90 mm, a short-circuit conductor section 10 is rectangular measuring 90 mm×5 mm, and short-circuit conductor sections 11 and 12 are rectangular measuring 45 mm×5 mm. Further, FIG. 10 and FIG. 11 show impedance characteristics (input VSWR) and a radiation pattern (XY plane), respectively. From FIG. 10, it can be seen that the half-wavelength slot antenna 30 resonates at 1.6 GHz. FIG. 11 shows a radiation pattern or a frequency of 1.6 GHz. From FIG. 11, slightly higher directivity in a Y-direction can be seen. This is because, as shown in FIG. 5, the short-circuit conductor section 10 functions as a reflection plate.

As described above, the housing antenna 20 and the half-wavelength slot antenna 30 have different radiation directivities from each other, so that it is assumed that correlation coefficient between the antennas is low. Accordingly, desirable array performance can be expected as a MIMO antenna, an adaptive array antenna, and an array antenna of maximum ratio combining or the like.

Next, an antenna array formed by combining the housing antenna 20 and the half-wavelength slot antenna 30 will be described.

Figure 12:
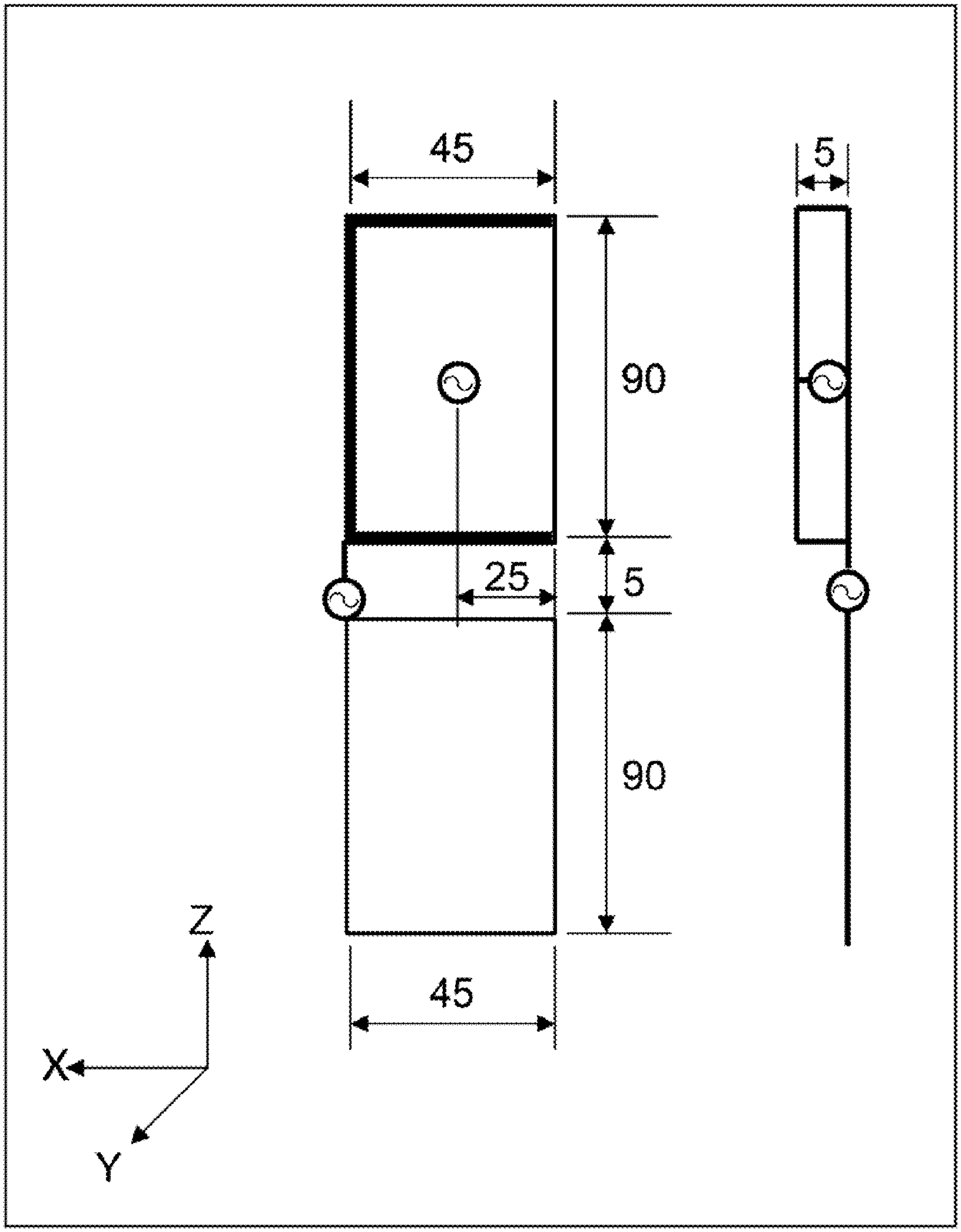
FIG. 12 shows a diagram illustrating an exemplary prototype of an antenna array, which is obtained by combining both antennas.

FIG. 12 is an exemplary prototype of an array antenna formed by combining the housing antenna 20 shown in FIG. 6 and the half-wavelength slot antenna 30 shown in FIG. 9. Additionally, FIG. 13 shows impedance characteristics (input VSWR) of both antennas, and FIG. 14 shows reflection characteristics and mutual coupling characteristics (transmission characteristics between antennas) of both antennas.

Figure 13:
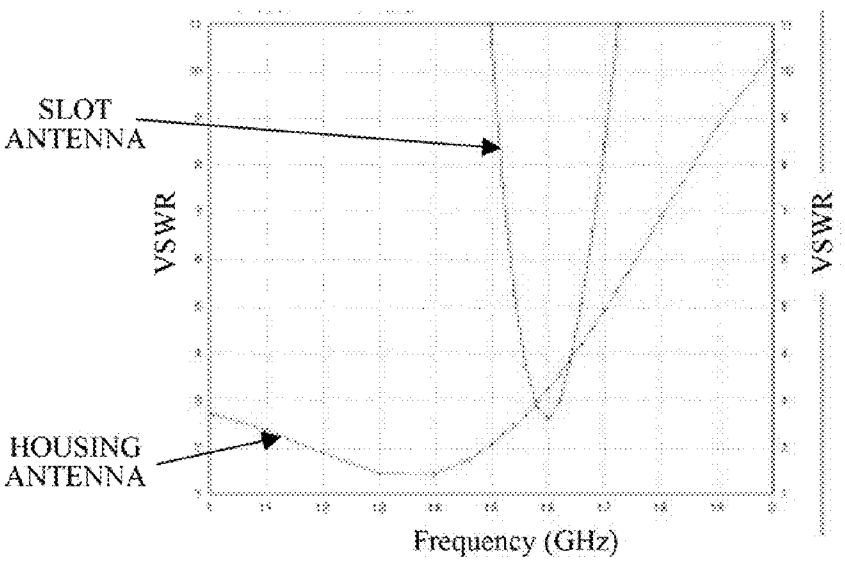
FIG. 13 shows a diagram illustrating impedance characteristics of the antenna array shown in FIG. 12.
Figure 14:
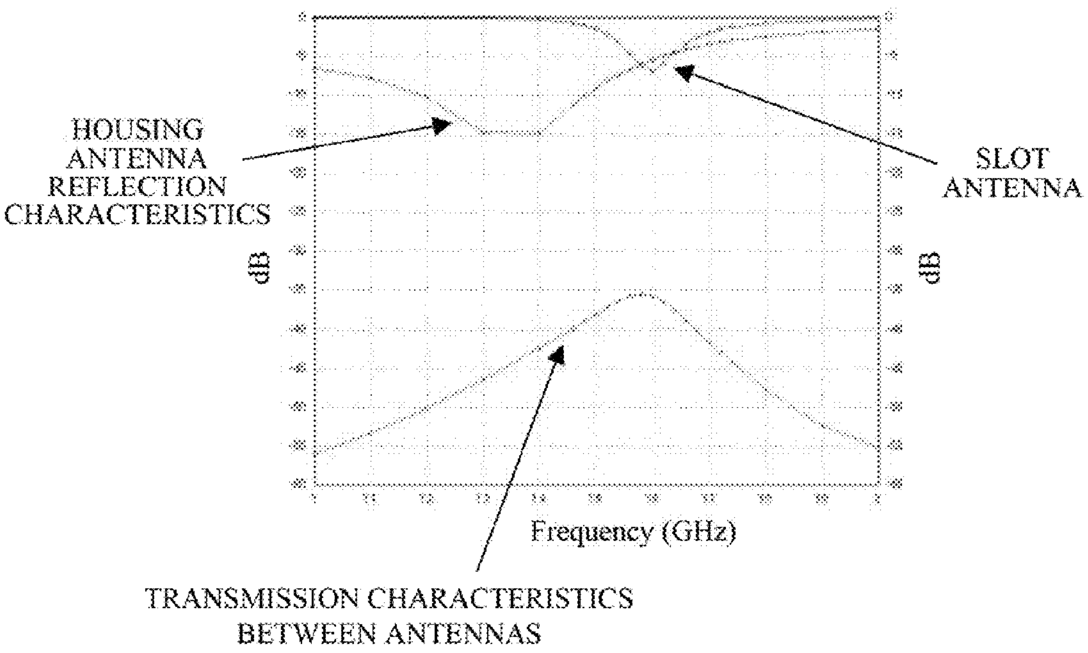
FIG. 14 shows a diagram illustrating the reflection characteristics and mutual coupling characteristics of the antenna array shown in FIG. 12.

From FIG. 13, it can be seen that the antenna array resonates at 1.6 GHz. According to FIG. 13, in comparison with FIG. 7 and FIG. 10, impedance characteristics of the antenna array are almost unchanged. That is, it can be seen that two antennas forming the antenna array are hardly affected by one another. This is because the short-circuit conductor sections 10 to 12 provided between the first power supply section 2 of the housing antenna 20 and the power supply section 3 of the half-wavelength slot antenna 30 improve shielding effect.

Accordingly, each antenna can be designed independently, which provides an effect of easing designing of each antenna.

Further, according to FIG. 14, it can be seen that the mutual coupling characteristics are −35 dB and below. Accordingly, an electric power of one antenna absorbed by the other antenna is less than or equal to a tenth, so that decrease of radiation efficiency of the one antenna is up to −0.5 dB. As a result, desirable radiation efficiency with low deterioration can be realized.

Figure 15:
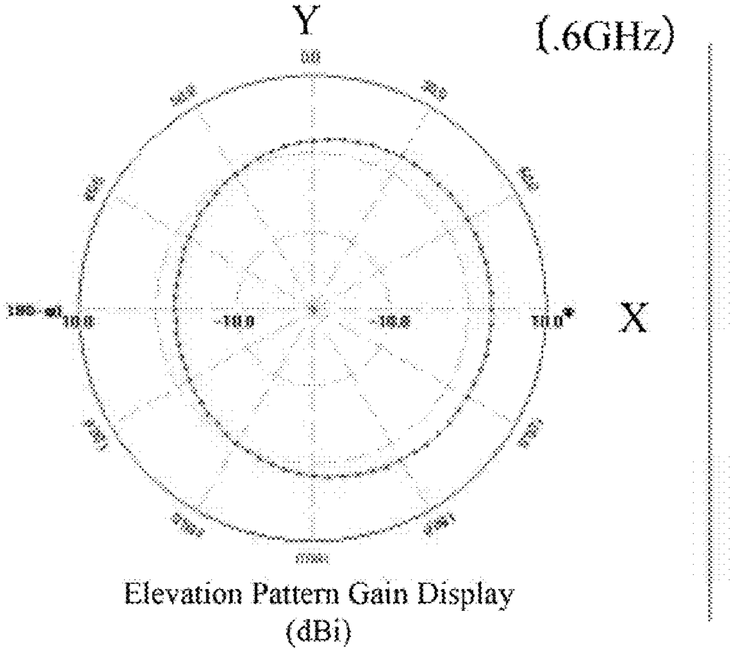
FIG. 15 shows a diagram illustrating radiation directivity of the housing antenna 20 in the antenna array.
Figure 16:
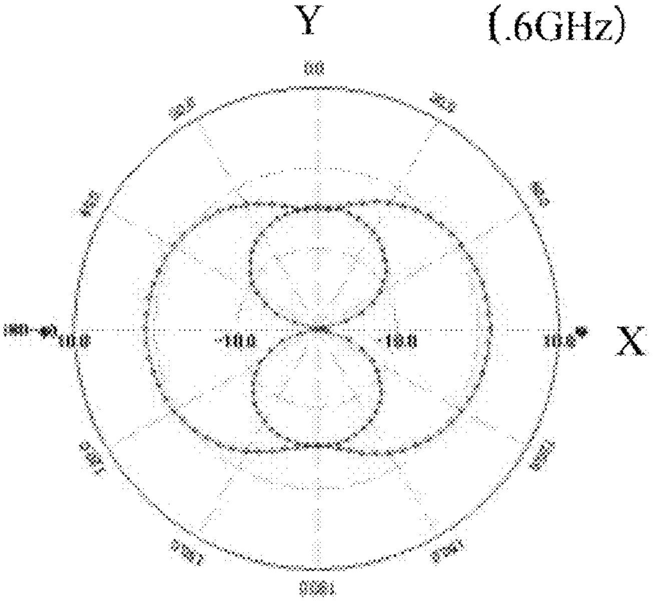
FIG. 16 shows a diagram illustrating radiation directivity of the half-wavelength antenna 30 in the antenna array.

FIG. 15 and FIG. 16 show radiation directivities of the housing antenna 20 and the half-wavelength slot antenna 30, respectively, when both function as an antenna array. Although the radiation directivity of the half-wavelength slot antenna 30 shown in FIG. 16 is slightly lower in comparison with the case of individual functioning, the housing antenna 20 and the half-wavelength slot antenna 30 can obtain the directivity similar to that of the individual case, and variation of directivity is small in the case of functioning as an antenna array.

As described above, the mobile wireless communication apparatus according to the first embodiment of the present invention can realize an antenna which has small mutual coupling between antennas and different directivities to obtain desirable array characteristics, and the mobile wireless communication apparatus according to the First embodiment of the present invention is most suitable for a compact mobile wireless communication apparatus.

Figure 17:
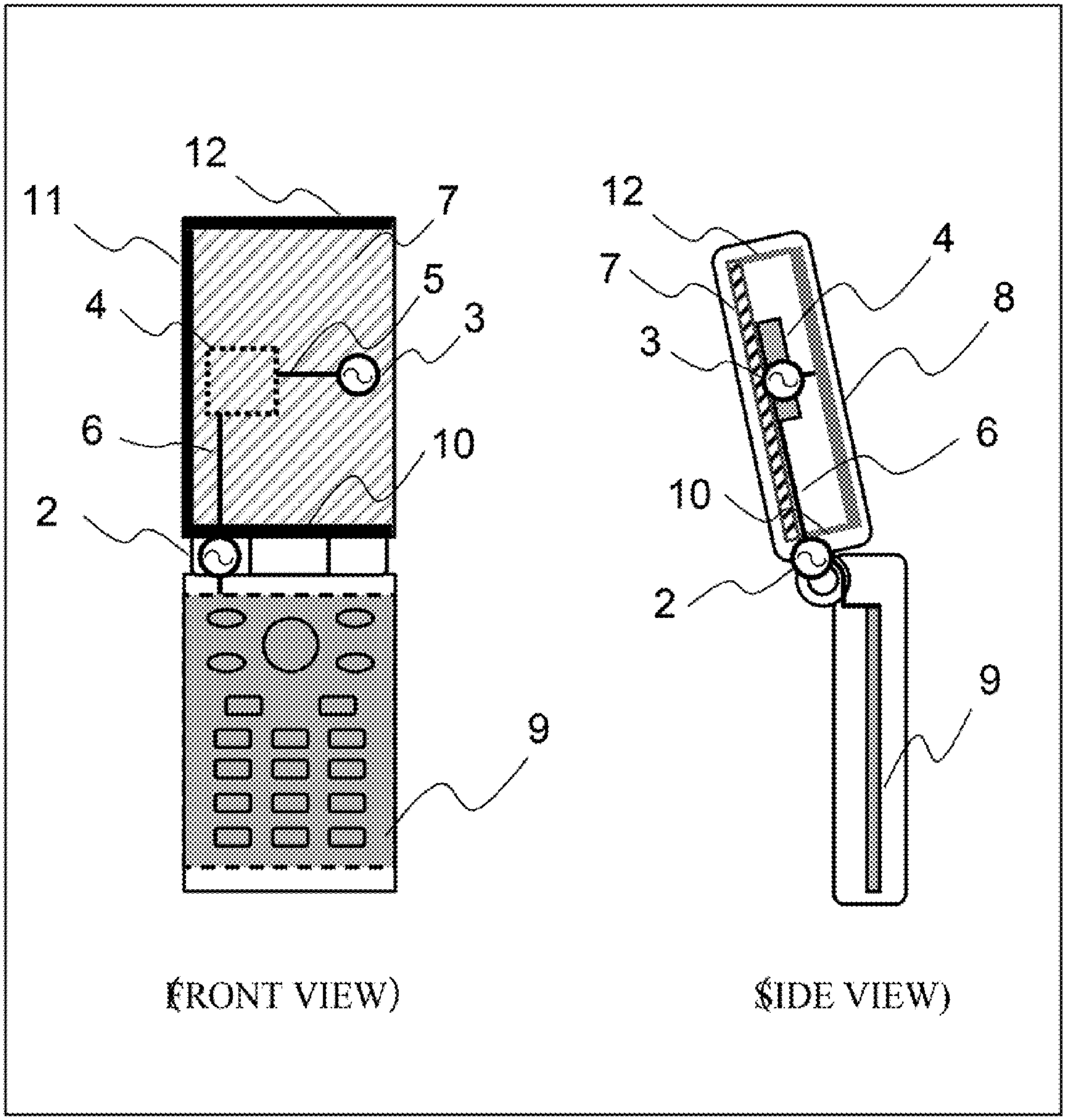
FIG. 17 shows a diagram illustrating an inner structure of another mobile wireless communication apparatus according to the first embodiment of the present invention.

The example where the wireless communication circuit 4 is mounted on the ground conductor section 9 is described in the First embodiment. However, as shown in FIG. 17, the wireless communication circuit 4 may be mounted on the first conductor section 7. Such configuration allows the second feedline 5 wired to the second power supply section 3 to be shortened. Further, since the first conductor section 7 becomes a common ground of the first power supply section 2 and the second power supply section 3, the stabilization and a simple construction of the ground can be advantageously realized.

Additionally, although, in the first embodiment, the flip-type mobile wireless communication apparatus as shown in FIG. 1 is described as an example, the antenna array configuration of the present invention is applicable to a mobile wireless communication apparatus having other various structures (non-flip type, slide type).

Further, when a part of the housing of the mobile wireless communication apparatus is formed of a conductive material, the part can be used as the first conductor section 7.

(Second Embodiment)

A mobile wireless communication apparatus according to a second embodiment of the present invention allows the half-wavelength slot antenna 30 to resonate at different frequencies by switching the short-circuit conductor section 12 (or the short-circuit conductor section 11, hereinafter referred to similarly) of the mobile wireless communication apparatus according to the first embodiment.

In order to achieve resonances at two frequencies, the short-circuit conductor section 12 of the half-wavelength slot antenna 30 is caused to be an open circuit in the case of resonance at a first frequency, and is caused to be a short circuit in the case of resonance at a second frequency. As a result, two orthogonal resonant modes can be realized.

Figure 18:
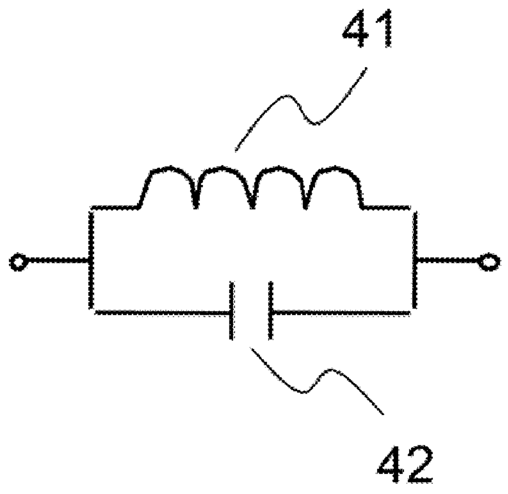
FIG. 18 shows a diagram illustrating an example of a specific circuit of a short-circuit conductor section 12 used for a mobile wireless communication apparatus according to a second embodiment of the present invention.

FIG. 18 is a diagram showing a specific circuit example of the short-circuit conductor section 12.

Figure 19:
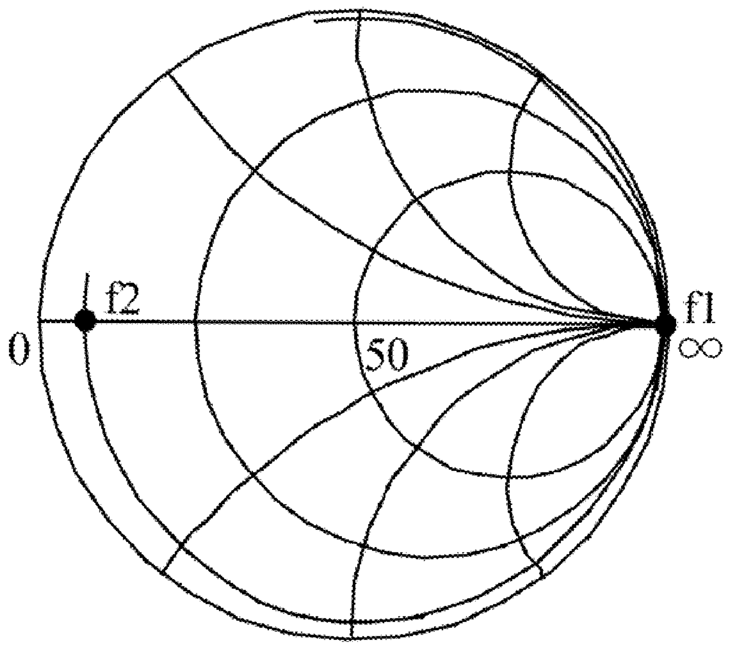
FIG. 19 shows a diagram illustrating a Smith chart of the circuit shown in FIG. 18.

FIG. 18 is a parallel resonant circuit consisting of an inductor 41 and a capacitor 42, where impedance reaches an infinite value at a resonant frequency, resulting in an open-circuit condition. A Smith chart under such a condition is shown in FIG. 19. In the example, magnitude of each of the inductor 41 and the capacitor 42 is determined so as to resonate at a first frequency f1. The circuit is in an open-circuit condition at a first frequency f1, and in low impedance and short circuited at a second frequency f2, which is higher than the first frequency f1.

Figure 20:
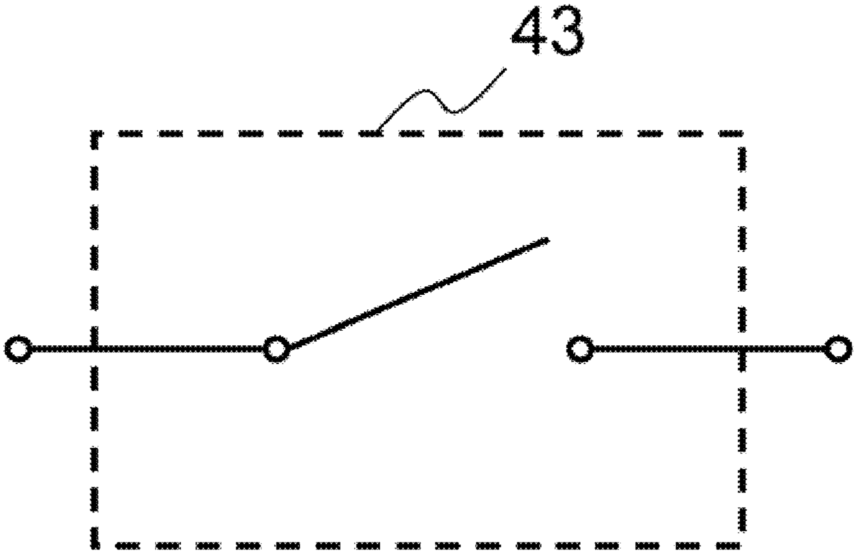
FIG. 20 shows a diagram illustrating an example of another specific circuit for realizing the short-circuit conductor section 12.

On the other hand, the short-circuit conductor section 12 may be replaced with a switch 43 shown in FIG. 20. In such a case, the switch 43 is connected at the time of operation at the first frequency, the switch 43 is open at the time of operation at the second frequency.

As described above, the mobile wireless communication apparatus according to the second embodiment of the invention uses, for the short-circuit conductor section 12, a circuit where impedance is changed in accordance with a frequency, whereby resonance at two frequencies can be achieved in one apparatus.

(Third Embodiment)

Figure 21:
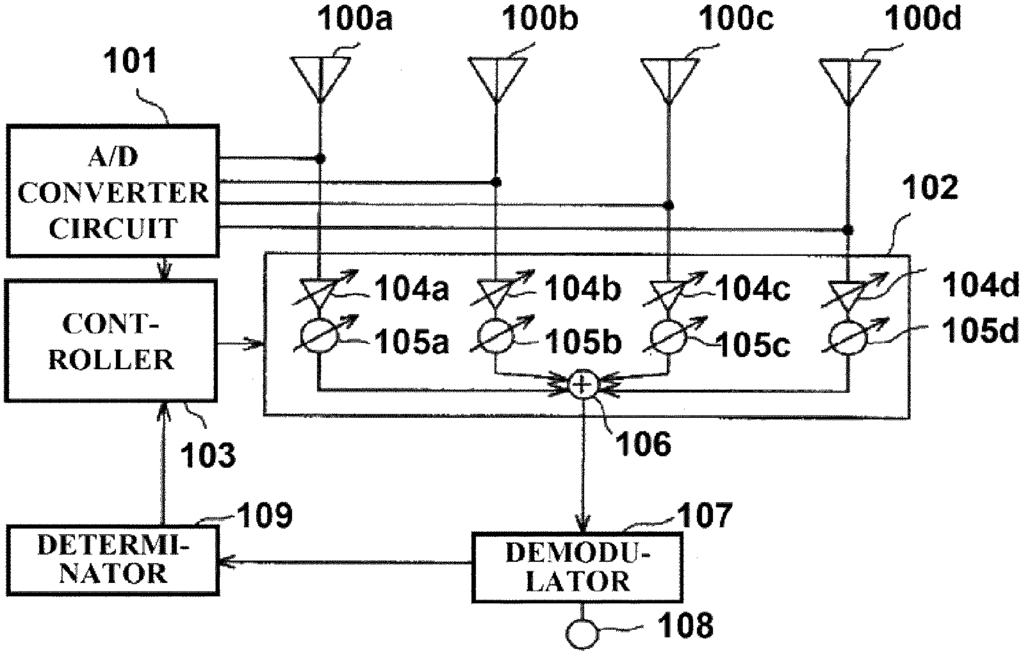
FIG. 21 shows a diagram illustrating a structure of an adaptive antenna device according to a third embodiment of the present invention.

FIG. 21 is a diagram showing a structure of an adaptive antenna device according to a third embodiment of the present invention. In FIG. 21, the adaptive antenna device according to the third embodiment includes four antenna elements 100*a-d*, an analog/digital converter circuit (A/D converter circuit) 101, an adaptive control circuit 102, a controller 103, a determinator 109, and a demodulator 107. The housing antenna 20 and the half-wavelength slot antenna 30 described in the first embodiment are used for two of the four antenna elements 100*a-d*.

In FIG. 21, a wireless signal received by each of the antenna elements 100*a-d* is inputted to both of the A/D converter circuit 101 and the adaptive control circuit 102. The A/D converter circuit 101 includes A/D converters corresponding to the antenna elements 100*a-d*. respectively, and converts analog wireless signals received by the antenna elements 100*a-d* to digital signals, respectively to output the converted results to the controller 103.

The adaptive control circuit 102 includes four variable amplifiers 104*a-d*, four variable phase-shifters 105*a-d* and a signal synthesizer 106. The amount of variable amplification of the variable amplifiers 104*a-d* and the amount of phase shift of the variable phase-shifters 105*a-d* are controlled by the controller 103. A wireless signal received by the antenna element 100*a* is outputted via the variable amplifier 104*a* and the variable phase-shifter 105*a*, a wireless signal received by the antenna element 100*b* is outputted via the variable amplifier 104*b* and the variable phase-shifter 105*b*, a wireless signal received by the antenna element 100*c* is outputted via the variable amplifier 104*c* and the variable phase-shifter 105*c*, and a wireless signal received by the antenna element 100*d* is outputted via the variable amplifier 104*d* and the variable phase-shifter 105*d*, to the signal synthesizer 106, respectively. The signal synthesizer 106 synthesizes (adds) the inputted four wireless signals so as to output the result to the demodulator 107.

The demodulator 107 demodulates the synthesized wireless signals inputted from the signal synthesizer 106, by using a predetermined digital demodulation method, to a baseband signal that is the demodulated signal, and outputs the demodulated result to the output terminal 108 and the determinator 109. The determinator 109 determines an error rate based on a reference pattern, which is included in the inputted baseband signal and is within a predetermined reference pattern period, and outputs the error rate to the controller 103. The controller 103 uses an adaptive control method, which will be described in detail, to control the adaptive control circuit 102 such that a wireless signal having the optimum signal integrity is received and demodulated.

Note that, in FIG. 21, basic configuration for processing a wireless signal, a high-frequency filter, a high-frequency amplifier, a high-frequency circuit, an intermediate-frequency circuit, and a signal processing circuits are omitted. That is, in the adaptive control circuit 102, processing may be executed at a carrier frequency or at an intermediate frequency. Further, the configuration order of the components, that is, the variable amplifiers 104*a-d* and the variable phase-shifters 105*a-d* in the adaptive control circuit 102 may be reversed.

First, an adaptive control method in the adaptive antenna device will be described below. The adaptive antenna device uses an adaptive control technique to maximize a radiation pattern of an antenna toward a direction of arrival of a desired radio wave (i.e., to substantially direct the main beam in the radiation pattern toward the direction of the desired wave), and to direct NULL in the radiation pattern toward a direction of an interference wave which causes interference (i.e., to substantially direct NULL in the radiation pattern toward the direction of the interference wave), thereby achieving a stable wireless communication. Generally, the adaptive antenna device performs controlling to obtain the maximum desired signal power and the minimum interference signal power, by providing a wireless signal received by each of the antenna elements 100*a-d*, (or an intermediate-frequency signal frequency converted from the wireless signal) with an amplitude difference and a phase difference.

Each of the antenna elements 100*a-d* generally receives a thermal noise component together with a desired wave. Further, a co-channel interference wave having a common frequency radiated from a neighboring base station, or a delay wave which is temporally delayed because of having been arrived via a detour route, though it is a desired wave, may be received. The delay wave deteriorates, as a ghost, for example, appearing on a television receiver, quality of a screen display in an analog wireless communication system such as television broadcasting or radio broadcasting. On the other hand, a thermal noise component, the co-channel interference wave and the delay wave affect a digital wireless communication system as a bit error rate, and directly deteriorate signal integrity. Here, assuming that a desired wave power is C, a thermal noise power is N, and power of an interference wave including a co-channel interference wave and the delay wave is 1, the adaptive antenna device performs adaptive control to favorably maximize C/(N+1) in order to improve signal integrity.

Next, a specific operation of the adaptive control apparatus will be described.

A wireless signal received by each of the antenna elements 100*a-d* is converted in the A/D converter circuit 101 to a digital signal x(t) (a signal vector having four parameters in the case of the present embodiment) to be inputted to the controller 103. The controller 103 determines amplitude amounts and shift amounts of the variable amplifiers 104*a-d* and the variable phase-shifters 105*a-d* in the adaptive control circuit 102, respectively, and the amplitude amounts and the shift amounts allow a wireless signal y(t), outputted from the adaptive control circuit 162, to have the optimum signal integrity.

A method for calculating a weighting coefficient including the amplitude amount and shift amount will be described. Note that, the weighting coefficient Wi is defined by the following formula (1) based on an amplitude amount Ai and a shift amount φi.

$$Wi-Ai\times\exp(j\times\phi i) \quad (1)$$

Here, j represents an imaginary unit. Additionally, i takes values 1 through 4, corresponding to systems for processing wireless signals received by the antenna elements 100*a-d*, respectively. A method for calculating the weighting coefficient Wi will be shown by defining weighting coefficient vector W that has the weighting coefficient Wi as a component thereof.

Although there are several methods for calculating the weighting coefficient Wi, an example using Least Means Squares (LMS) will be described. In the method, the adaptive antenna device preliminarily stores a reference signal r(t) that is a signal sequence included in a known desired wave, and performs control such that the signal sequence included in the received wireless signal become close to the reference signal r(t). Here, an example where the reference signal r(t) is preliminarily stored in the controller 103 will be shown. Specifically, the controller 103 controls the adaptive control circuit 102 so as to multiply a wireless digital signal x(t) by the weighting coefficient w(t) including components of an amplitude amount and a phase shift amount. A residual error e(t) between a multiplication result obtained by multiplying the weighting coefficient w(t) by the wireless digital signal x(t) and the reference signal r(t) is calculated from the following formula (2).

$$e(t)=r(t)-W(t)\times x(t) \quad (2)$$

Here, the residual error e(t) takes a positive or negative value. Accordingly, a minimum square value of the residual error e(t), calculated by the above-described formula (2), is calculated by repeating the calculation recursively. That is, the weighting coefficient w(t, m+1), obtained by repeating a calculation multiple times (m+1 limes), can be obtained by the following formula (3) based on the m-th weighting coefficient w(t, m).

$$W(t,m+1)=W(t,m)+u\times x(t)\times e(t,m) \quad (3)$$

Here, u is referred to as step size, and the repetition count of calculation, which allows the weighting coefficient w to converge to minimum value, is advantageously reduced when the step size u is large, but has a disadvantage that the weighting coefficient w fluctuates near the minimum when the step size u is too large. Accordingly, special attention should be paid depending on the system for selection of the step size U. On the contrary, the weighting coefficient w stably converges to the minimum when the step size u is small. However, the repetition count of calculation increases. When the repetition count increases, it takes a long time to obtain the weighting coefficient. In the case where calculation time of the weighting coefficient w takes longer than time (a few milliseconds) during which surrounding environment changes, improvement in signal integrity by the weighting coefficient w cannot be achieved. Consequently, it is necessary to select highest possible speed and more stable convergence condition when the step size u is determined. Further, the residual error e (t, m) is defined by the following formula (4).

$$e(t,m)=r(t)-W(t,m)\times x(t) \quad (4)$$

The formula (3) is updated in a recurring manner by using the value in the formula (4). Note that the maximum number of repetition of calculation for obtaining the weighting coefficient w is set such that time to calculate the weighting coefficient is not longer than switching time of a wireless system.

Here, a method for an adaptive control of the wireless communication system based on the Least Means Squares method is described as an example, but the present invention is not limited to this method, and RLS (Recursive Least Squares) method, or SMI (Sample Matrix Inversion) method, for example, which allow faster determination, for example, can be employed. Although determination can be performed faster by the methods, calculation in the determinator 109 becomes complicated. Further, in the case where the modulating method of a signal sequence is a constant envelope modulation, like a digital phase modulation, having a constant envelope, CMA (Constant Modulus Algorithm) can be employed.

Figure 22:
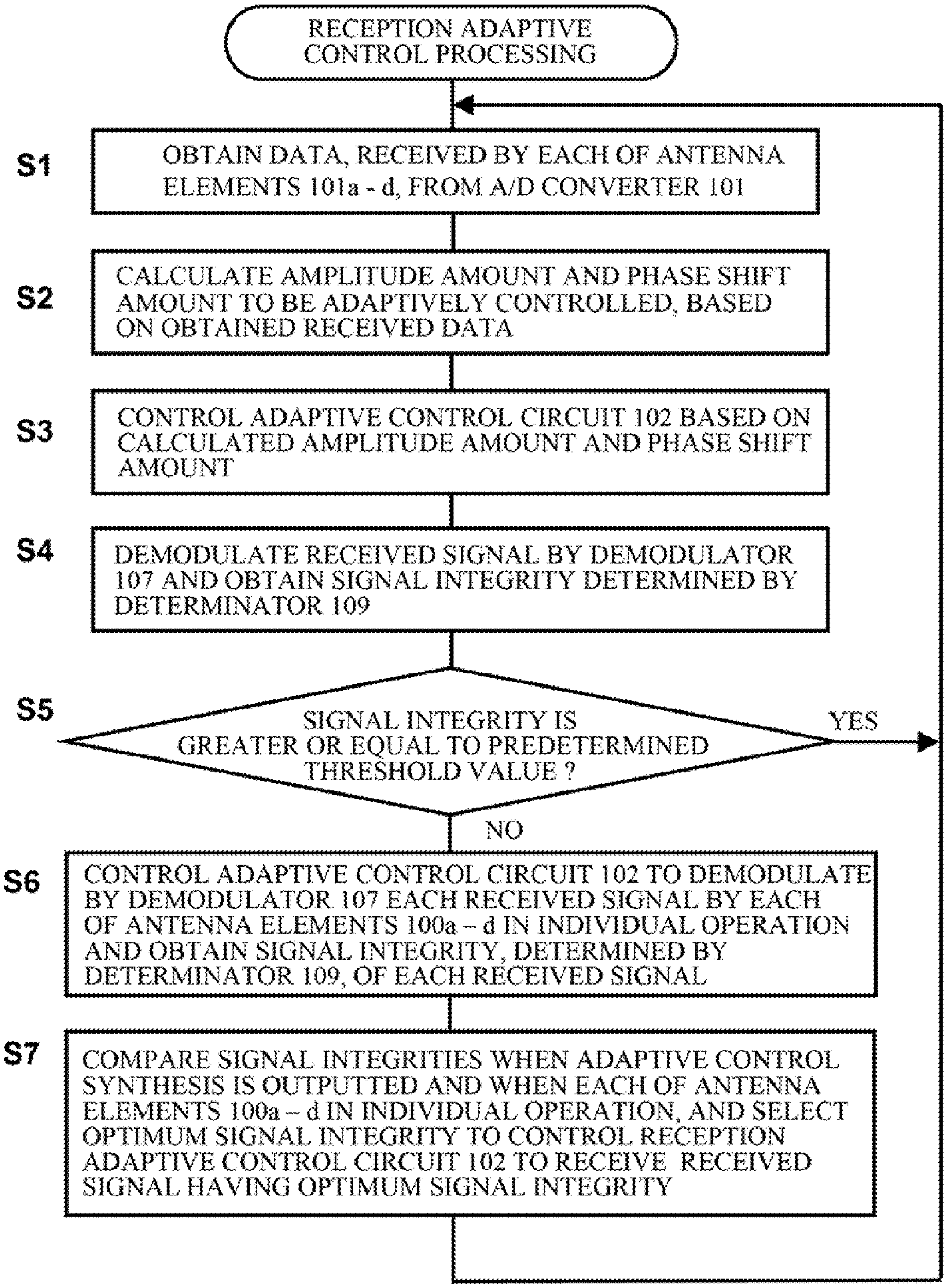
FIG. 22 shows a flowchart illustrating adaptive control processing performed by a controller 103 shown in FIG. 21.

FIG. 22 is a flowchart showing adaptive control processing performed by a controller 103 shown in FIG. 21.

In FIG. 22, first, the controller 103 obtains, from the A/D converter circuit 101, data received by each of the antenna elements 100*a-d* (step S1). Next, the controller 103 calculates an amplitude amount and a phase shift amount, required for the adaptive control, based on the obtained received data (step S2), and controls the adaptive control circuit 102 based on the calculated amplitude amount and phase shift amount (step S3). The demodulator 107 demodulates the received signals outputted from the adaptive control circuit 102 (step S4). The determinator 109 determines signal integrity of the received signal demodulated by the demodulator 107 (step S4). The controller 103 obtains signal integrity, that is error rate, determined by the determinator 109 (step S4). As a result, the controller 103 then determines the obtained error rate is greater than or equal to a predetermined threshold value (step S5).

In the case where the error rate is determined to be greater than or equal to $10^{-5}$ in step S5, the controller 103 obtains again, from the A/D converter circuit 101, the received data received by each of the antenna elements 100*a-d* (step S1). On the other hand, in the case where the error rate is determined to be less than $10^{-5}$ in step S5, the controller 103 controls the adaptive control circuit 102 to obtain an error rate of each of the antenna elements 100*a-d* in the individual operation (step S6).

Here, the antenna elements 100*a-d* in the individual operation means a state where only one of the antenna elements 100*a-d* operates. For example, the antenna element 100*a* in the individual operation means that only the antenna element 100*a* operates and the antenna elements 100*b-d* are not in operation. In this case, specifically, an amplification amount of a variable amplifier 104*a* is set at "1" and phase shift amount of a variable phase-shifter 115*a* at "0", and an amplification amount of a variable amplifier 104*a* at "0".

Finally, the controller 103 compares an error rate at the time when the adaptive control synthesis is outputted, with an error rate of the signal received by each of the antenna elements 100*a-d* in the individual operation, and selects the optimum error rate to control the adaptive control circuit 102 so as to receive a received signal having the selected optimum error rate (step S7).

Note that, in FIG. 22, it is desirable to wait for a predetermined time when processing returns from step S5 to step S1, and/or from step S7 to step S1.

As described above, in the adaptive antenna device according to the third embodiment of the present invention, error rates are checked while adaptive control is performed by using four antenna elements 100*a-d*. The error rate of each of the antenna elements 100*a-d* in the individual operation is measured when the error rate is under a predetermined threshold value, and the adaptive control circuit 102 is controlled so as to receive a received signal having the optimum error rate. Such switching control between the adaptive control and the individual operation of each of the antenna elements makes it possible to constantly select the received signal having the optimum signal integrity.

(Fourth Embodiment)

Figure 23:
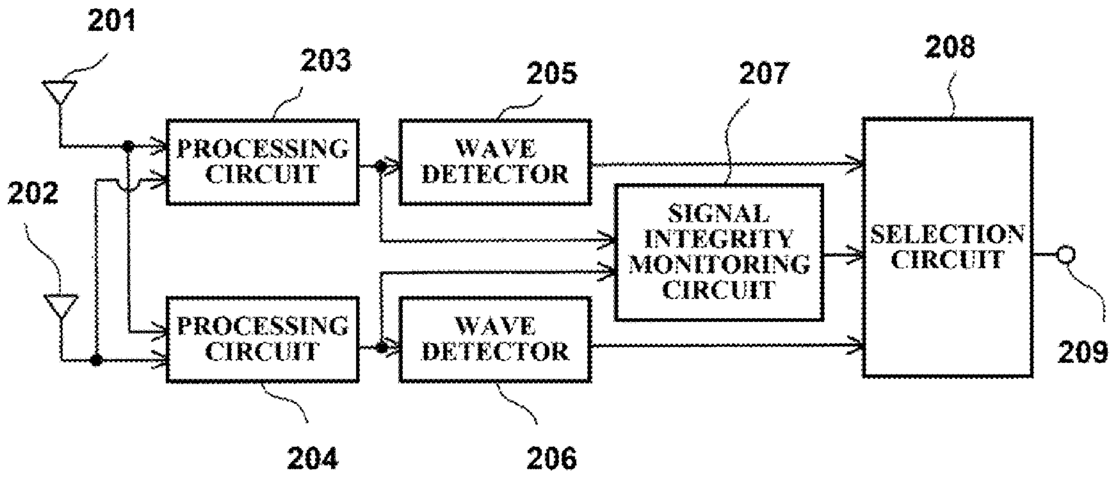
FIG. 23 shows a diagram illustrating a structure of a selection diversity antenna device according to a fourth embodiment of the present invention.

FIG. 23 is a diagram showing configuration of a selection diversity antenna device according to a fourth embodiment of the present invention. In FIG. 23, the selection diversity antenna device according to the fourth embodiment includes two antenna elements 201 and 202, two processing circuits 203 and 204, a signal integrity monitoring circuit 207 and a selection circuit 208. The housing antenna 20 and the half-wavelength slot antenna 30, described in the first embodiment, are used as the two antenna elements 201 and 202.

First, a wireless signal received by each of the antenna elements 201 and 202 is inputted to both of the processing circuits 203 and 204. The processing circuit 203 performs adaptive control processing on the inputted wireless signals to output the results to the wave detector 205 and the signal integrity monitoring circuit 207. Here, the processing circuit 203 maintains desirable signal integrity by suppressing interference waves in the received wireless signals. That is, the processing circuit 203 is significantly effective when a delay wave and/or a co-channel interference wave arrive from a neighboring base station. Additionally, the processing circuit 204 performs selection diversity processing on the inputted wireless signal to output the result to the wave detector 206 and the signal integrity monitoring circuit 207. Here, the processing circuits 204 maintains the desirable signal integrity by selecting a wireless signal having greater received power from among the received wireless signals received by the antenna elements 201 and 202, respectively. That is, the processing circuit 204 produces a great effect when a change in the received power is great like in the case of fading.

Here, the signal integrity monitoring circuit 207 determines signal integrity of a baseband signal which is a wireless signal adaptively controlled and modulated by the processing circuit 203, and signal integrity of a wireless signal on which selection diversity processing is performed by the processing circuit 204. Next, the selection circuit 208 selects, based on the determination result of the signal monitoring circuit 207, a baseband signal from a wave detector 205 or 206 corresponding to a signal having more desirable signal integrity and outputs the selected baseband signal to the output terminal 209.

As described above, the selection diversity antenna device according to the fourth embodiment of the present invention can solve both of two main factors, that is, interference waves and fading, for deterioration in signal integrity of the received signal in a mobile communication system.

(Fifth Embodiment)

Figure 24:
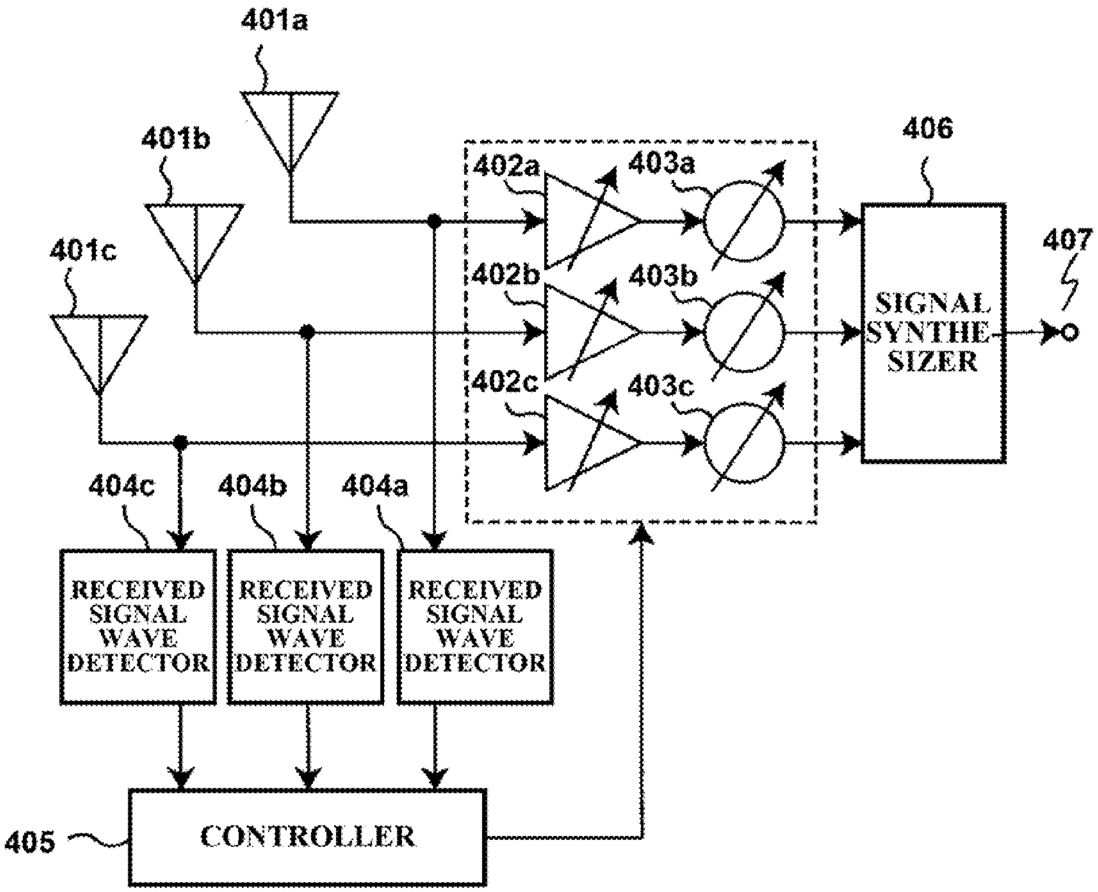
FIG. 24 shows a schematic diagram illustrating a structure of a combined diversity antenna device according to a fifth embodiment of the present invention.

FIG. 24 is a schematic diagram showing a configuration of a combined diversity antenna device according to a fifth embodiment of the present invention. In FIG. 24, the combined diversity antenna device includes three antenna elements 401*a-c*, variable amplifiers 402*a-c*, variable phase-shifters 403*a-c*, a signal synthesizer 406, a received signal wave detectors 404*a-c* and a controller 405. The variable amplifiers 402*a-c* are amplifiers having positive or negative amplification and can operate as attenuators. The housing antenna 20 and the half-wavelength slot antenna 30, described in the first embodiment, are used as two of the three antenna elements 401*a-c*.

In FIG. 24, each wireless signal received by each of the antenna elements 401*a-c* is inputted to both variable amplifiers 402*a-c* and received signal wave detectors 404*a-c*. Each of the received signal wave detectors 404*a-c* detects phase and amplitude of a wireless signal to output the detected data to the controller 405. The controller 405, using a well-known adaptive control method, controls amplification amounts of the variable amplifiers 402*a-c* and phase shift amounts of the variable phase-shifters 403*a-c* so as to achieve max ratio combined of the three wireless signals received by the antenna elements 401*a-c*. That is, the variable amplifiers

402*a-c* amplify or attenuate the wireless signals corresponding to ratio between the wireless signals, while the variable phase-shifters 403*a-c* align phases of the wireless signals and output the results to the signal synthesizer 406. The signal synthesizer 406 performs in-phase combination by maximum ratio combining on the inputted three wireless signals and outputs the result to the output terminal 407.

As described above, the combined diversity antenna device according to the fifth embodiment of the present invention makes it possible to obtain the stable received power.

(Sixth Embodiment)

Figure 25:
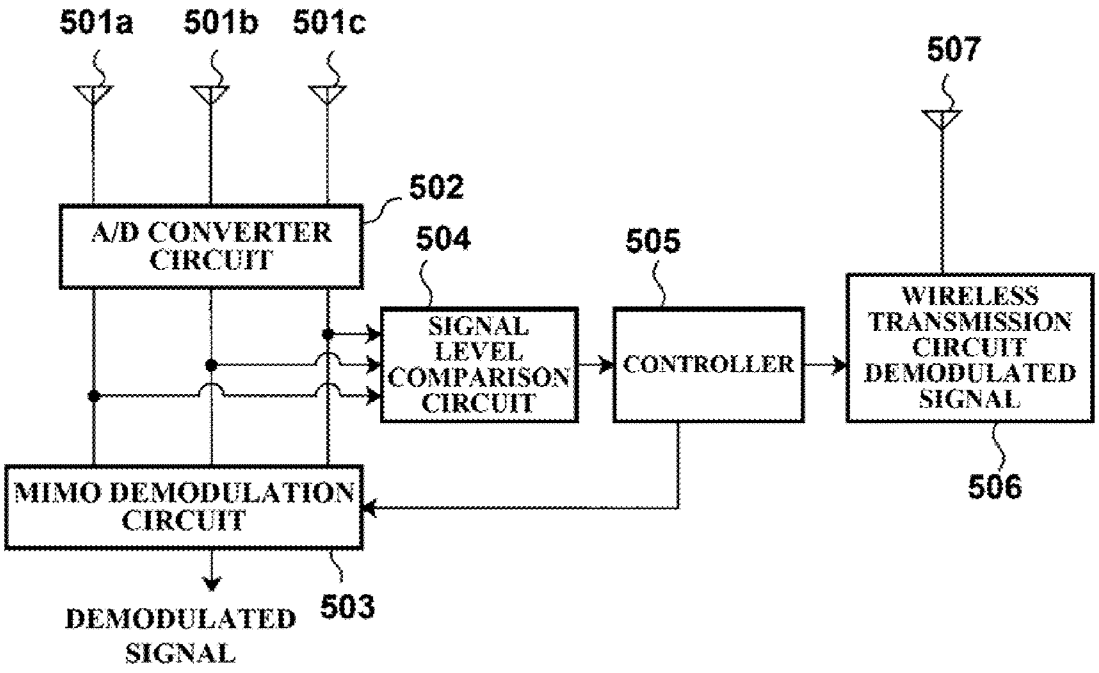
FIG. 25 shows a diagram illustrating a structure of a MIMO antenna device according to a sixth embodiment of the present invention.

FIG. 25 is a diagram showing configuration of a MIMO antenna device according to a sixth embodiment of the present invention. In FIG. 25, a MIMO device according to the sixth embodiment includes three feed antenna elements 501*a-c*, an analog/digital converter circuit (A/D converter circuit) 502, a MIMO demodulation circuit 503, a signal level comparison circuit 504, a controller 505, a wireless transmission circuit 506 and a transmission antenna element 507. The housing antenna 20 and the half-wavelength slot antenna 30 described in the first embodiment are used as two of the three feed antenna elements 501*a-c*.

The three feed antenna elements 501*a-c* are provided to respectively receive three different wireless signals transmitted from base station equipment (not shown) on the MIMO transmission side using a predetermined MIMO demodulation method. Each of the feed antenna elements 501*a-c* inputs the received wireless signal to the A/D converter circuit 502. The A/D converter circuit 502 includes three A/D converters corresponding to the inputted wireless signals, respectively, and the A/D converters individually perform A/D conversion processing on the respective wireless signals and outputs the processed signals (hereinafter referred to as received signals) to both of the MIMO demodulation circuit 503 and the signal level comparison circuit 504.

The MIMO demodulation circuit 503 performs MIMO demodulation processing on the three received signals to output one demodulated signal. The signal level comparison circuit 504 compares signal levels of the three received signals to output result data of the comparison to the controller 505. The controller 505 may change, depending on the result of the MIMO adaptive control processing, a MIMO communication method used in the base station equipment on the MIMO transmission side and used in the MIMO demodulation circuit 503. That is, the controller 505 transmits a control signal, by using the wireless transmission circuit 506 and the antenna element 507, to request the base station equipment on the MIMO transmission side to change MIMO demodulation method used in the base station equipment on the MIMO transmission side, and additionally cause the MIMO demodulation circuit 503 to change the MIMO demodulation method used therein.

It is desirable that the MIMO antenna device according to the sixth embodiment includes, in the first stage of the A/D conversion circuit 502, a high-frequency filter for separating a signal, having a predetermined frequency, from each of the wireless signals received by the feed antenna elements 501*a-c*, and a high-frequency amplifier for amplifying a signal when necessary. Further, it is desirable that the MIMO antenna device according to the sixth embodiment includes, in the first stage of the MIMO demodulation circuit 503, a high frequency circuit such as a mixer for converting a frequency of each of the received signals outputted from the A/D converter circuit 502, an inter-mediate frequency circuit, the processing circuits, and the like when necessary. Note that the above-described components are omitted in the present specification and drawings for simplicity.

INDUSTRIAL APPLICABILITY

The present invention is applicable to a wireless communication apparatus, for example, equipped with a MIMO antenna and/or an adaptive array antenna, and especially suitable, for the case of controlling mobile communication using a mobile telephone and the like so as to maintain desirable communication quality while realizing high-speed communication by increasing communication capacity.

The invention claimed is:

1. A mobile wireless communication apparatus comprising:

a first conductor section having a rectangular shape;

a second conductor section having the same shape and the same size as the first conductor section, arranged in parallel with and spaced from the first conductor section so as to have a predetermined distance there between;

three short-circuit conductor sections electrically connecting any three edges of the first conductor section with three edges of the second conductor section that are face-to-face with the any three edges of the first conductor section;

a ground conductor section spaced by a predetermined distance from the first conductor section; and a wireless communication circuit, wherein a first feeding point on the first conductor section is connected to the wireless communication circuit via a first power supply section arranged between the first conductor section and the ground conductor section, so that the first conductor section and the ground conductor section operate as a first antenna element, a second feeding point on the second conductor section is connected to the wireless communication circuit via a second power supply section arranged between the first conductor section and the second conductor section, so that the first conductor section, the second conductor section and the three short-circuit conductor sections operate as a second antenna element, and a length of one side of the first or second conductor section, to which the three short-circuit conductor sections are not connected, is half of a wavelength of a communication signal so that the second antenna element operates as a half-wavelength slot antenna.

2. The mobile wireless communication apparatus according to claim 1, wherein the first conductor section is a part of a housing of the mobile wireless communication apparatus, the housing being formed of a conductive material.

3. The mobile wireless communication apparatus according to claim 1, wherein the wireless communication circuit is mounted on the first conductor section.

4. The mobile wireless communication apparatus according to claim 1, further comprising:

an adaptive control circuit for executing adaptive control processing on a wireless signal received by each of the first and the second antenna elements to synthesize the adaptively controlled wireless signals;

a demodulation circuit for demodulating the synthesized wireless signal and a wireless signal individually received by each of the first antenna element and the second antenna element; and an apparatus control circuit for comparing signal integrity obtained by demodulating the synthesized wireless signal, with signal integrity obtained by demodulating each of the wireless signals received by the first and the second antenna elements, and controlling the adaptive control circuit so that a wireless signal having optimum signal integrity determined by the comparison is received.

5. The mobile wireless communication apparatus according to claim 1, further comprising:

a first processing circuit for executing adaptive control processing on wireless signals received by the first and the second antenna elements;

a second processing circuit for executing selection diversity processing on the wireless signals received by the first and the second antenna elements; and a selection circuit for comparing signal integrity of a wireless signal outputted from the first processing circuit with signal integrity of a wireless signal outputted from the second processing circuit, and selectively outputting a signal having desirable signal integrity.

6. The mobile wireless communication apparatus according to claim 1, further comprising:

an adaptive control circuit for executing adaptive control processing on a wireless signal received by each of the first and the second antenna elements, and synthesizing the adaptively controlled wireless signals; and an apparatus control circuit for detecting phase and amplitude of a wireless signal received by each of the first and the second antenna elements, and controlling the adaptive control circuit so as to perform maximum ratio combining of the wireless signals.

7. The mobile wireless communication apparatus according to claim 1, further comprising a multi-input multi-output (MIMO) demodulation circuit for executing MIMO demodulation processing on a wireless signal received by each of the first and the second antenna elements to output one demodulated signal.

8. A mobile wireless communication apparatus comprising:

a first conductor section having a rectangular shape;

a second conductor section having the same shape and the same size as the first conductor section, arranged in parallel with and spaced from the first conductor section so as to have a predetermined distance there between;

two short-circuit conductor sections electrically connecting any two adjacent edges of the first conductor section with two edges of the second conductor section that are face-to-face with the any two adjacent edges of the first conductor section;

a ground conductor section spaced by a predetermined distance from the first conductor section; and a wireless communication circuit, wherein a first feeding point on the first conductor section is connected to the wireless communication circuit via a first power supply section arranged between the first conductor section and the ground conductor section, so that the first conductor section and the ground conductor section operate as a first antenna element, a second feeding point on the second conductor section is connected to the wireless communication circuit via a second power supply section arranged between the first conductor section and the second conductor section, so that the first conductor section, the second conductor section and the two short-circuit conductor sections operate as a second antenna element, and a total length of two edges of the first conductor section, to which the two short-circuit conductor sections are not connected, is half of a wavelength of a communication signal so that the second antenna element operates as a half-wavelength slot antenna.

9. The mobile wireless communication apparatus according to claim 8, wherein the first conductor section is a part of a housing of the mobile wireless communication apparatus, the housing being formed of a conductive material.

10. The mobile wireless communication apparatus according to claim 8, wherein the wireless communication circuit is mounted on the first conductor section.

11. The mobile wireless communication apparatus according to claim 8, further comprising:

an adaptive control circuit for executing adaptive control processing on a wireless signal received by each of the first and the second antenna elements to synthesize the adaptively controlled wireless signals;

a demodulation circuit for demodulating the synthesized wireless signal and a wireless signal individually received by each of the first antenna element and the second antenna element; and an apparatus control circuit for comparing signal integrity obtained by demodulating the synthesized wireless signal, with signal integrity obtained by demodulating each of the wireless signals received by the first and the second antenna elements, and controlling the adaptive control circuit so that a wireless signal having optimum signal integrity determined by the comparison is received.

12. The mobile wireless communication apparatus according to claim 8, further comprising:

a first processing circuit for executing adaptive control processing on wireless signals received by the first and the second antenna elements;

a second processing circuit for executing selection diversity processing on the wireless signals received by the first and the second antenna elements; and a selection circuit for comparing signal integrity of a wireless signal outputted from the first processing circuit with signal integrity of a wireless signal outputted from the second processing circuit, and selectively outputting a signal having desirable signal integrity.

13. The mobile wireless communication apparatus according to claim 8, further comprising:

an adaptive control circuit for executing adaptive control processing on a wireless signal received by each of the first and the second antenna elements, and synthesizing the adaptively controlled wireless signals; and an apparatus control circuit for detecting phase and amplitude of a wireless signal received by each of the first and the second antenna elements, and controlling the adaptive control circuit so as to perform maximum ratio combining of the wireless signals.

14. The mobile wireless communication apparatus according to claim 8, further comprising a multi-input multi-output (MIMO) demodulation circuit for executing MIMO demodulation processing on a wireless signal received by each of the first and the second antenna elements to output one demodulated signal.

15. A mobile wireless communication apparatus comprising:

a first conductor section having a rectangular shape;

a second conductor section having the same shape and the same size as the first conductor section, arranged in parallel with and spaced from the first conductor section so as to have a predetermined distance there between;

two short-circuit conductor sections arranged between any two adjacent edges of the first conductor section and two edges of the second conductor section that are face-to-face with the any two adjacent edges of the first conductor section;

a parallel resonant circuit having a capacitor and an inductor that are parallely-connected and arranged between another edge of the first conductor section and another edge, facing the other edge of the first conductor section, of the second conductor section;

a ground conductor section spaced by a predetermined distance from the first conductor section; and a wireless communication circuit, wherein the parallel resonant circuit electrically connects the first conductor section and the second conductor section with regard to a signal at a first frequency, and electrically opens the first conductor section and the second conductor section with regard to a signal at a second frequency, a first feeding point on the first conductor section is connected to the wireless communication circuit via a first power supply section arranged between the first conductor section and the ground conductor section, so that the first conductor section and the ground conductor section operate as a first antenna element, and a second feeding point on the second conductor section is connected to the wireless communication circuit via a second power supply section arranged between the first conductor section and the second conductor section, so that the first conductor section, the second conductor section, the parallel resonant circuit, and the two short-circuit conductor sections operate as a second antenna element.

16. The mobile wireless communication apparatus according to claim 15, further comprising:

an adaptive control circuit for executing adaptive control processing on a wireless signal received by each of the first and the second antenna elements to synthesize the adaptively controlled wireless signals;

a demodulation circuit for demodulating the synthesized wireless signal and a wireless signal individually received by each of the first antenna element and the second antenna element; and an apparatus control circuit for comparing signal integrity obtained by demodulating the synthesized wireless signal, with signal integrity obtained by demodulating each of the wireless signals received by the first and the second antenna elements, and controlling the adaptive control circuit so that a wireless signal having optimum signal integrity determined by the comparison is received.

17. The mobile wireless communication apparatus according to claim 15, further comprising:

a first processing circuit for executing adaptive control processing on wireless signals received by the first and the second antenna elements;

a second processing circuit for executing selection diversity processing on the wireless signals received by the first and the second antenna elements; and a selection circuit for comparing signal integrity of a wireless signal outputted from the first processing circuit with signal integrity of a wireless signal outputted from the second processing circuit, and selectively outputting a signal having desirable signal integrity.

18. The mobile wireless communication apparatus according to claim 15, further comprising:

an adaptive control circuit for executing adaptive control processing on a wireless signal received by each of the first and the second antenna elements, and synthesizing the adaptively controlled wireless signals; and an apparatus control circuit for detecting phase and amplitude of a wireless signal received by each of the first and the second antenna elements, and controlling the adaptive control circuit so as to perform maximum ratio combining of the wireless signals.

19. The mobile wireless communication apparatus according to claim 15, further comprising a multi-input multi-output (MIMO) demodulation circuit for executing MIMO demodulation processing on a wireless signal received by each of the first and the second antenna elements to output one demodulated signal.

20. A mobile wireless communication apparatus comprising:

a first conductor section having a rectangular shape;

a second conductor section having the same shape and the same size as the first conductor section, arranged in parallel with and spaced from the first conductor section so as to have a predetermined distance there between;

two short-circuit conductor sections arranged between any two adjacent edges of the first conductor section and two edges of the second conductor section that are face-to-face with the any two adjacent edges of the first conductor section;

a switch circuit arranged between another edge of the first conductor section and another edge, facing the other edge of the first conductor section, of the second conductor section;

a ground conductor section spaced by a predetermined distance from the first conductor section;

a wireless communication circuit; and a control section causing the switch circuit to be short-circuited when receiving a signal at a first frequency, and causing the switch circuit to be open when receiving a signal at a second frequency, wherein a first feeding point on the first conductor section is connected to the wireless communication circuit via a first power supply section arranged between the first conductor section and the ground conductor section, so that the first conductor section and the ground conductor section operate as a first antenna element, and a second feeding point on the second conductor section is connected to the wireless communication circuit via a second power supply section arranged between the first conductor section and the second conductor section, so that the first conductor section, the second conductor section, the switch circuit, and the two short-circuit conductor sections operate as a second antenna element.

21. The mobile wireless communication apparatus according to claim 20, further comprising:

an adaptive control circuit for executing adaptive control processing on a wireless signal received by each of the first and the second antenna elements to synthesize the adaptively controlled wireless signals;

a demodulation circuit for demodulating the synthesized wireless signal and a wireless signal individually received by each of the first antenna element and the second antenna element; and an apparatus control circuit for comparing signal integrity obtained by demodulating the synthesized wireless signal, with signal integrity obtained by demodulating each of the wireless signals received by the first and the second antenna elements, and controlling the adaptive control circuit so that a wireless signal having optimum signal integrity determined by the comparison is received.

22. The mobile wireless communication apparatus according to claim 20, further comprising:

a first processing circuit for executing adaptive control processing on wireless signals received by the first and the second antenna elements;

a second processing circuit for executing selection diversity processing on the wireless signals received by the first and the second antenna elements; and a selection circuit for comparing signal integrity of a wireless signal outputted from the first processing circuit with signal integrity of a wireless signal outputted from the second processing circuit, and selectively outputting a signal having desirable signal integrity.

23. The mobile wireless communication apparatus according to claim 20, further comprising:

an adaptive control circuit for executing adaptive control processing on a wireless signal received by each of the first and the second antenna elements, and synthesizing the adaptively controlled wireless signals; and an apparatus control circuit for detecting phase and amplitude of a wireless signal received by each of the first and the second antenna elements, and controlling the adaptive control circuit so as to perform maximum ratio combining of the wireless signals.

24. The mobile wireless communication apparatus according to claim 20, further comprising a multi-input multi-output (MIMO) demodulation circuit for executing MIMO demodulation processing on a wireless signal received by each of the first and the second antenna elements to output one demodulated signal.

* * * * *